United States Patent [19]

Frankel et al.

[11] Patent Number: 4,814,373

[45] Date of Patent: Mar. 21, 1989

[54] MODIFIED LATEX POLYMER COMPOSITION

[75] Inventors: Lawrence S. Frankel, Jenkintown, Pa.; Gerald L. Jones, Norfolk, Mass.; Donald A. Winey, Warminster, Pa.

[73] Assignee: Rohm and Haas Company, Philadelphia, Pa.

[21] Appl. No.: 92,816

[22] Filed: Sep. 3, 1987

Related U.S. Application Data

[63] Continuation of Ser. No. 683,902, Dec. 20, 1984, abandoned.

[51] Int. Cl.$^4$ .............................................. C08F 2/16
[52] U.S. Cl. .................................... 524/460; 524/458; 524/457
[58] Field of Search ...................... 524/460, 457, 458

[56] References Cited

U.S. PATENT DOCUMENTS 4,427,836  1/1984  Kowalski et al. ................... 524/460

Primary Examiner—Joseph L. Schofer
Assistant Examiner—J. M. Reddick

[57] ABSTRACT

This invention relates to modified aqueous dispersions of water-insoluble latex polymer prepared by swelling an initial water-insoluble latex polymer, prepared by emulsion polymerization, with additional ethylenically unsaturated monomer, including at least one monomer with two or more sites of ethylenic unsaturation, and subsequently polymerizing the additional monomer within the swollen latex particles.

55 Claims, No Drawings

MODIFIED LATEX POLYMER COMPOSITION

This application is a continuation of application Ser. No. 683,902, filed Dec. 20, 1984, now abandoned.

BACKGROUND OF THE INVENTION

1. Field of the Invention

This invention relates to modified aqueous dispersions of water-insoluble latex polymer and to compositions prepared using these dispersions. The modified latex polymer yields films which are useful as binders for coatings for leather and polyurethane foam and other substrates, and which show improved toughness, hardness and tensile strength while retaining substantial extensibility. The modifed latex may be processed to yield cellular polymeric foams or coagulated to yield elastomeric gumstock which may be molded into articles or extruded as sheet for roll roofing membrane, protective warp and related applications. Thus this invention also relates to the synthetic polymeric coatings art, particularly the elastomeric and semi-elastomeric coatings arts and also to the thermoplastic elastomer art.

2. Brief Description of the Prior Art

Protective and decorative coatings for flexible or extensible substrates pose several serious challenges for the coatings chemist. For example, coatings for leather used in shoe uppers must stand up to repeated flexing without loss of adhesion or cracking. Thus, the coatings themselves must be relatively flexible. Coatings applied to many surfaces exposed to the elements must be able to withstand severe mechanical stress, as in the case of painted wood, the surface of which may be subjected to rapid and severe temperature changes during exterior exposure. Failure of the paint film in this case often appears as grain cracking and rupture of the film. Formed-in-place polyurethane foam roofs present an extreme example of the same phenomena. While hard (high glass transition temperature) polymeric binders may be used to prepare paints for wood trim and many other exterior applications, relatively soft (low glass transition temperature) binders are preferred for monolithic polyurethane foam roofing which encounters substantial thermal stresses.

In developing coatings for both leather and exterior polyurethane foam, the coatings chemist encounters the problem of preparing polymeric binders which are both flexible and durable. A related problem has been that low glass transition temperature polymers, for example acrylic polymers, are not only soft and flexible, but they also tend to be tacky. While the tack of these materials is often viewed as a virtue, as by the formulator of adhesives, in coatings applications tack is generally not desirable for both esthetic and functional reasons.

Further, many applications in which protective coatings are used, such as coatings for roofs, demand the high level of performance traditionally associated with solvent-based coatings and especially those based on thermosetting polymers. Yet, in these same applications often only coatings based on thermoplastic binders, such as employed in many water-based coatings, may be used because of a variety of practical problems.

In addition, environmental constraints mandate that the coatings chemist minimize the amount of organic solvent present in his formulation, a goal realizable by employing an aqueous dispersion of latex polymer as binder.

However, the unique properties of aqueous dispersions of latex polymer present problems which must be surmounted in order to approximate the performance of coatings based on polymers dissolved in organic solvents. It is conventional wisdom that the properties of coatings formed from aqueous dispersions of latex polymer should ideally reflect the nature and relative proportions of the comonomers used in preparing the polymer and be independent of the polymerization method used.

For example, an emulsion-polymerized latex which is essentially a homopolymer of a higher alkyl acrylate, such as 2-ethylhexyl acrylate (2-EHA), may, under the right circumstances, yield a coating film which has a glass transition temperature ($T_g$) and other physical properties approximating that of a 2-EHA homopolymer prepared by bulk or solution polymerization. Meeting this ideal depends on a number of factors, including successful fusion of the individual latex particles to achieve a continuous film.

Latex particle fusion depends on interparticle diffusion of individual polymer chains. "Soft" particles composed of polymer molecules with glass transition temperatures significantly below ambient are known to fuse readily. Restrictions on chain diffusion, such as intraparticle crosslinking, tend to interfere with the chain diffusion process and reduce film fusion. When the monomer used to prepare the latex is sufficiently "hard" (i.e., corresponding homopolymers have relatively high $T_g$), as in the case of polystyrene latex, no film formation takes place on drying the latex. In order to obtain "hard" coatings from water-dispersed latex, the coatings chemist has a variety of techhiques at his command. For example, he may soften relatively high $T_g$ latex particles by swelling them with a fugative plasticizer, that is, a coalescent, which eventually evaporates from the dried film after formation. This will result in a "harder" (higher $T_g$) film than could otherwise be formed. Alternatively, the chemist may crosslink the film after formation. At high crosslink density, measured film hardness may be significantly increased. On the other hand, a low level of post-film formation crosslinking will enhance the elastomeric properties of the film.

In some coatings applications, such as the area of protective coatings for monolithic, spray-in-place polyurethane foam roofing, a relatively soft coating is desired, so that the coating may conform with the thermal expansion and contraction of the substrate. On the other hand, it is also desirable that this kind of coating be tough, and to some extent, elastomeric. Coated roofs must often be walked upon to obtain access to roof-mounted ventilators, air conditioning heat exchangers, skylights and the like. Similarly, they should resist mechanical damage from hailstones and the effect of the aggregate which is sometimes used to protect the surface. Prior to the present invention, toughness could be imparted to soft protective coatings through crosslinking the polymer chains or by the addition of reinforcing fillers.

Polymer films may be crosslinked by a variety of techniques. For example, the polymer chemist may include comonomers in a latex polymer which have two or more sites of functionality wlth different reactivities with the intention of crosslinking the film after fusion of the latex parties.

For example, one site may be that of ethylenic unsaturation so that the monomer will copolymerize, and the other may be a halogen or other reactive moiety, so that the polymer chains may be crosslinked after film formation. This technique is employed in the case of acrylic elastomers, where both vinyl chloracetate and 2-chloroethyl vinyl ether are used as comonomers with ethyl acrylate to prepare latex particles by emulsion polymerization. The latex particles of elastomer are coagulated, dried and molded to the shape of the desired article. Subsequently, the elastomer is vulcanized by heat-activated crosslinking of reactive halogen sites through a crosslinking or vulcanization agent such as sodium stearate/sulfur. Note that if the latex particles or coagulum were crosslinked prior to molding, it is unlikely that the desired article could be successfully molded, as crosslinking "fixes" the shape of the particles or coagulum by restraining the migration of polymer chains necessary to achieve a continuum within the molded article. The particles are no longer plastic. The same deficiency is observed in crosslinked latex particles intended for surface coatings applications. Although a small degree of crosslinking, desirable for such reasons as reduced particle swelling, may not have a severe adverse effect on film formation, heavily crosslinked particles may not form films, even though the constituent monomers are appropriately soft by the Tg criterion, because the crosslinking interferes with the inter-particle polymer diffusion necessary for good film formation.

In the case of natural rubber latex, which contains a large proportion of ethylenic unsaturation in the polymer chain backbone itself, and in the case of chemically similar synthetic rubber latexes, the latex may be crosslinked to a substantial degree prior to coagulation and molding. This "prevulcanization" may be effected by using ionizing radiation as a free radical source, and it may be sensitized by swelling the rubber latex with monomer containing multiple sites of ethylenic unsaturation. Because of the very high proportion of potential crosslinking sites on the rubber polymer chain, and the low Tg of the polymer, a substantial degree of prevulcanization may occur without severely affecting the ability of the latex coagulum to flow sufficiently at the elevated molding temperature to produce the shape of the desired article. Inter-particle polymer diffusion is, nevertheless, inhibited to some extent by prevulcanization, and the properties of prevulcanized rubber are not equivalent to those of post-vulcanized rubber. When there are only a few crosslinking sites distributed randomly along the polymer chains in a latex particle, crosslinking necessarily imposes long range constraints on the diffusive freedom such molecules would otherwise enjoy.

In many coating applications it is either undesirable or impossible to post crosslink films formed from latex particles, although the properties of such films would be substantially enhanced by crosslinking. For example, a coating may be applied in the field over exterior substrates such as concrete buildings and other structures, and it may be impossible to apply heat to the coated substrate in a controlled fashion sufficient to activate conventional cross-linking agents. Crosslinking agents reactive at ambient temperature present a different host of problems such as high toxicity, flammability and long term residual environmental persistance. Finally, the additional skilled labor required to apply the crosslinker may simply be unavailable or unjustifiable economically. Yet the coatings chemist is severely hindered if he is restricted to a palette consisting of comonomers of differeing $T_g$ in his effort to paint a latex coating which is both tough and extensible. There is a need for coating compositions which offer the convenience and low toxicity of latex polymer aqueous dispersions with the enhanced toughness and reduced tack of post-crosslinked systems.

Latex of relatively low $T_g$ thermoplastic polymers may be coagulated in batch or continuously to yield elastomeric gumstock or pellets which may be further processed and/or modified as is typical of elastomeric materials. Alternatively, the latex coagulate itself may be modified by addition of crosslinking agent, fillers and/or processing aids and subsequently molded to give shaped articles such as gaskets, "O" rings, shoe heels and the like. The gumstock or coagulate may also be further processed as sheet which may be reinforced by the incorporation of fibrous material such as chopped glass, glass scrim, fiber roving and the like. The elastomer properties of coagulated low $T_g$ latex polymers are generally improved by the addition of crosslink agent during processing. However, addition of such agent may require additional processing time and increased capital and materials costs for the manufacturers of elastomeric articles. While "prevulcanized" natural and synthetic rubber latex polymers are available to the processor, and such materials requiring either a reduced amount of crosslinking agent during processing or none at all, there is a need for latex polymer which contains essentially no sites of ethylenic unsaturation, in contrast to "prevulcanized" rubber, and increased toughness while requiring the addition of little or no external crosslinker during processing of the coagulum.

Further, in many applications, especially coatings, semi-elastomeric materials are preferred to true elastomers, because the ability to dissipate applied stress by flow over a relatively long time period is a virtue. However, there is a need for materials which not only can slowly dissipate suddenly applied stresses by flow, but also which are not tacky at ambient temperatures as are many commercial thermoplastic elastomers.

SUMMARY OF THE INVENTION

This invention has as an object an aqueous dispersion of an improved water-insoluble latex which yields soft coatings which are toughened relative to prior art coatings. An advantage of the present invention is that coatings prepared using these improved latexes do not require treatment with an external crosslinking agent, such as ionizing radiation or chemical polymerization initiators, in order to achieve toughness. Another advantage of the present invention is that coatings prepared using these improved latexes retain a substantial degree of extensibility compared with coatings of comparable tensile strength prepared with higher $T_g$ monomer. A further advantageous feature of the present invention is that coatings prepared using the modified latex of the present invention exhibit a reduction in tack compared with prior art coatings and consequently show reduced dirt pickup, staying attractive longer. Coatings prepared with the improved latex of the present invention also have the advantage of reduced swelling by water and solvents. They also advantageously exhibit increased hardness.

The improved water-insoluble latex of the present invention may be used to prepare cellular foam coatings and molded articles. These foams advantageously exhibit enhanced recovery after compression and enhanced stand alone strength when cast onto a removable substrate such as release paper.

The improved water-insoluble latex of the present invention may also be coagulated in batch or continuously to produce gumstock, sheet or profile products. Articles prepared from coagulant of the improved water-insoluble latex polymer of the present invention advantageouslyrequire less crosslinking agent added during coagulant processing to attain a desired level of toughness ih comparison with prior art latex polymer. Another advantage is that latex polymer having essentially no sites of ethylenic unsaturation may be employed in applications requiring polymer with elastomeric character previously requiring natural or synthetic rubber containing substantial unsaturation. Such unsaturated elastomers are more prone to environmental degradation than those prepared from the improved latex polymer of the present invention.

These and other objects and advantages, which will be further disclosed below, are met by the present invention which is an aqueous dispersion of an improved water-insoluble latex polymer prepared by the process comprising (a) preparing by emulsion polymerization an initial aqueous dispersion of a water-insoluble latex polymer of at least one ethylenically unsaturated monomer, wherein said ethylenically unsaturated monomer comprises no more than about two percent by weight, based on the total weight of said ethylenically unsaturated monomer, of multi-ethylenically unsaturated monomer and wherein said initial water-insoluble latex polymer otherwise contains essentially no sites of ethylenic unsaturation, (b) dispersing in said initial aqueous dispersion of initial water-insoluble latex polymer additional ethylenically unsaturated monomer comprising at least one monomer having at least two sites of ethylenic unsaturation, whereby said additional monomer swells said initial polymer, and (c) polymerizing said additional monomer within said monomer-swollen initial latex polymer.

DETAILED DESCRIPTION

The present invention relates to an aqueous dispersion of an improved water-insoluble latex polymer prepared by a process comprising (a) preparing by emulsion polymerization an initial aqueous dispersion of an initial water-insoluble latex polymer of at least one ethylenically unsaturated monomer, wherein said ethylenically unsaturated monomer comprises no more than about two percent by weight, based on the total weight of said ethylenically unsaturated monomer and wherein said initial water-insoluble latex polymer otherwise contains essentially no sites of ethylenic unsaturation, (b) dispersing in said initial aqueous dispersion of initial water-insoluble latex polymer additional ethylenically unsaturated monomer comprising at least one monomer having at least two sites of ethylenic unsaturation, whereby said additional monomer swells said initial latex polymer, and (c) polymerizing said additional monomer within said monomer-swollen initial latex polymer.

In another embodiment, the initial aqueous dispersion of initial water-insoluble latex polymer is prepared solely from monomer which is alpha, beta-ethylenically unsaturated. Thus, the aqueous dispersion of improved water-insoluble latex polymer is prepared by a process comprising (a) preparing by emulsion polymerization an initial aqueous dispersion of an initial water-insoluble latex polymer of at least one alpha, beta-ethylenically unsaturated monomer, wherein said alpha, beta-ethylenically unsaturated monomer comprises no more than about two percent by weight, based on the total weight of said ethylenically unsaturated monomer, of multi-alpha, beta-ethylenically unsaturated monomer and wherein said initial water-insoluble latex polymer otherwise contains essentially no sites of ethylenic unsaturation, (b) dispersing in said initial aqueous dispersion of initial water-insoluble latex additional ethylenically unsaturated monomer comprising at least one monomer having at least two sites ethylenic unsaturation, whereby said additional monomer swells said initial polymer, and (c) polymerizing said additional monomer within said monomer-swollen initial latex polymer.

In another embodiment, polymerization of the additional monomer is not begun until after the additional monomer has been permitted to swell the initial latex polymer essentially to equilibrium. Thus, in this embodiment, the aqueous dispersion of an improved water-insoluble latex polymer prepared by the process comprising (a) preparing by emulsion polymerization an initial aqueous dispersion of an initial water-insoluble latex polymer of at least one ethylenically unsaturated monomer, wherein said ethylenically unsaturated monomer comprises no more than about two percent by weight, based on the total weight of said ethylenically unsaturated monomer, of multi-ethylenically unsaturated monomer and wherein said initial water-insoluble latex polymer otherwise contains essentially no sites of ethylenic unsaturation, (b) dispersing in said initial aqueous dispersion of initial water-insoluble latex polymer additional ethylenically unsaturated monomer comprising at least one monomer having at least two sites of ethylenic unsaturation, whereby said additional monomer swells said initial polymer, (c) waiting until said initial latex polymer is swollen essentially to equilibrium with said additional ethylenically unsaturated monomer, and (d) polymerizing said additional monomer within said monomer-swollen initial latex polymer.

This invention also relates to a method of preparing coating compositions for applications requiring a relatively soft coatings, such as leather coatings, caulks and roof mastics and to these coatings compositions themselves. These coatings compositions comprise an aqueous dispersion of improved water-insoluble latex polymer.

This invention also relates to methods of coagulating aqueous dispersions of improved water-insoluble latex polymer, methods of processing the coagulum, and articles prepared by processing the coagulum.

This invention also relates to foamed compositions and articles prepared using improved water-insoluble latex polymer and the processes employed in preparing these compositions and articles.

The preparation of aqueous dispersions of water-insoluble latex polymer by emulsion polymerization for use in coatings applications is well known in the art. The practice of emulsion polymerization is discussed in detail in D. C. Blackley, *Emulsion Polymerization* (Wiley, 1975). Conventional emulsion polymerization techniques may be used to prepare the initial aqueous dispersion of water-insoluble latex polymer of this invention. The practice of emulsion polymerization is also discussed in H. Warson, *The Applications of Synthetic Resin Emulsions,* Chapter 2 (Ernest Benn Ltd., London 1972).

Thus, monomers may be emulsified with an anionic, cationic or nonionic dispersing agent, using for example from about 0.05% to 10% by weight of dispersing agent on the weight of total monomers. Combinations of anionic and nonionic emulsifiers may also be used. High molecular weight polymers such as hydroxy ethyl cellulose, methyl cellulose and polyvinyl alcohol may be used as emulsion stabilizers and protective colloids, as may polyelectrolytes such as polyacrylic acid. Acidic monomers, particularly those of low molecular weight, such as acrylic and methacrylic acid, are water-soluble, and thus may serve as dispersing agents which aid in emulsifying the other monomers used.

Suitable cationic dispersion agents include laurylpyridinium chlorides, cetyldimethyl amine acetate, and alkyldimethylbenzylammonium chlorides in which the alkyl group has from 8 to 18 carbon atoms.

Suitable anionic dispersing agents include, for example, the higher fatty alcohol sulfates, such as sodium lauryl sulfate, and the like; alkylaryl sufonates such as sodium or potassium isopropylbenzene sulfonates or isopropyl napththalene sulfonates, and the like; alkali metal higher alkyl sulfosuccinates, such as sodium octyl sulfosuccinate, sodium N-methyl-N-palmitoyltaurate, sodium oleyl isothionate, and the like; and alkali metal salts of alkylarylpolyethoxyethanol sulfates or sulfonates, such as sodium tert-octylphenoxypolyethoxyethyl sulfate having 1 to 5 oxyethylene units, and the like.

Suitable non-ionic dispersing agents include alkylphenoxypolyethoxyethanols having alkyl groups of from about 7 to 18 carbon atoms and from about 6 to about 60 oxyethylene units, such as heptylphenoxypolyethoxyethanols, methyloctylphenoxypolyethoxyethanols, and the like; polyethoxyethanol derivatives of methylene-linked alkyl phenols; sulfur-containing agents such as those made by condensing from about 6 to about 60 moles of ethylene oxide with nonyl mercaptan, dodecyl mercaptan, and the like, or with alkylthiophenols wherein the alkyl groups contain from 6 to 16 carbon atoms; ethylene oxide derivatives of long-chained carboxylic acids, such as lauric acid, myristic acid, palmitic acid, oleic acid, and the like, or mixtures of acids such as those found in tall oil containing from 6 to 60 oxethylene units per molecule; analagous ethylene oxide condensates of long-chained alcohols such as octyl, decyl, lauryl, or cetyl alcohols, ethylene oxide derivative of etherified or esterified polyhydroxy compounds having a hydrophobic hydrocarbon chain, such as sorbitan monostearate containing from 6 to 60 oxethylene units; also, ethylene oxide condensates of long-chain or branched chain amines, such as dodecyl amine, hexadecyl amine, and octadecyl amine, containing from 6 to 60 oxyethylene units; block copolymers of ethylene oxide sections combined with one or more hydrophobic propylene oxide sections. Mixtures of alkyl benzenesulfonates and ethoxylated alkylphenols may be employed.

A polymerization initiator of the free radical type, such as ammonium or potassium persulfate, may be used alone or as the oxidizing component of a redox system, which also includes a reducing component such as potassium metabisulfite, sodium thiosulfate or sodium formaldehyde sulfoxylate. The reducing component is frequently referred to as an accelerator. The initiator and accelerator, commonly referred to as catalyst, catalyst system or redox system, may be used in proportion from about 0.01% or less to 3% each, based on the weight of monomers to be copolymerized. Examples of redox catalyst systems include t-butyl hydroperoxide/sodium formaldehyde sulfoxylate/Fe(II), and ammonium persulfate/sodium bisulfite/sodium hydrosulfite/Fe(II). The polymerization temperature may be from room temperature to 90° C., or more, and may be optimized for the catalyst system employed, as is conventional. Emulsion polymerization may be seeded or unseeded. Seeded polymerization is preferred and tends to yield aqueous dispersions of latex polymer having more uniform physical properties than unseeded polymerization.

Chain transfer agents including mercaptans, polymercaptans and polyhalogen compounds are sometimes desirable in the polymerization mixture to moderate polymer molecular weight. Examples of chain transfer agents which may be used include long chain alkyl mercaptans such as t-dodecyl mercaptans, alcohols such as isopropanol, isobutanol, lauryl alcohol or t-octyl alcohol, carbon tetrachloride, tetrachloroethylene and trichlorobromoethane. Generally from about 0 to 3% by weight, based on the weight of the monomer mixture, may be used.

The polymerization process may be a thermal or redox type; that is, free radicals may be generated solely by the thermal dissociation of an initiator species or a redox system may be used. A monomer emulsion containing all or some portion of the monomers to be polymerized may be prepared using the monomers, water and emulsifiers. A catalyst solution containing catalyst in water may be separately prepared. The monomer emulsion and catalyst solution may be cofed into the polymerization vessel over the course of the emulsion polymerization. The reaction vessel itself may initially contain water. The reaction vessel may also additionally contain seed emulsion and further may additionally contain an initial charge of polymerization catalyst. The temperature of the reaction vessel during the emulsion polymerization may be controlled by cooling to remove heat generated by the polymerization reaction or by heating the reaction vessel. Several monomer emulsions may be simultaneously cofed into the reaction vessel. When multiple monomer emulsions are cofed, they may be of different monomer composition. The sequence and rates at which the divers monomer emulsions are cofed may be altered during the emulsion polymerization process. After addition of the monomer emulsion or emulsions has been completed, the polymerization reaction mixture may be chased to minimize the concentrations of unreacted monomer and unreacted polymerization catalyst species. The pH of the contents of the reaction vessel may also be altered during the course of the emulsion polymerization process. Both thermal and redox polymerization processes may be employed.

The monomers used in preparing the initial aqueous dispersion of latex polymer may be any of those conventionally used in the synthetic resin emulsion art. The selection of monomers to be employed will be largely governed by the intended end-use application of the compositions of this invention. For example, when the improved latex polymer is to be used as a binder for an exterior coating composition, such as those used to protect sprayed-in-place polyurethane foam roofing (roof mastics), monomers which yield polymers having high ultraviolet resistance are preferred. Thus, acrylic monomers are preferred for preparing latex polymer to be used in exterior coating compositions. However, acrylic monomers may be used to prepare polymeric latex useful in a wide variety of other applications, such as leather finishes and coatings, clear and pigmented coatings for wood and other architectural substrates, caulks, and sealants. Examples of acrylic monomers include the ($C_1$–$C_{24}$)alkyl esters of acrylic and methacrylic acids. Examples of ($C_1$–$C_{24}$) alkyl groups of esters of acrylic and methacrylic acids which may be used in forming the initial latex polymer used in the invention include: methyl, propyl, isopropyl, butyl, isobutyl, sec-butyl, t-butyl, amyl, isoamyl, t-amyl, hexyl, cyclohexyl, 2-ethylhexyl, octyl, decyl, lauryl, myristyl, cetyl, stearyl groups and the like. Specific examples include: methyl methacrylate, ethyl acrylate, or n-butyl acrylate, 2-ethylhexyl acrylate, lauryl methacrylate, isodecyl methacrylate, methyl acrylate, ethyl methacrylate, sec-butyl acrylate and t-butyl methacrylate. The ($C_1$–$C_{12}$)alkyl esters of acrylic and methacrylic acid are preferred in preparing the instant latex polymer.

For exterior coating compositions, acrylic monomers yielding low $T_g$ polymers ("low $T_g$ monomers") are preferred. Thus, butyl acrylate and 2-ethylhexyl acrylate are especially preferred for use in preparing the initial latex polymer for modified latexes to be used in preparing coatings for polyurethane foam roofs.

While alkyl acrylates and methacrylates are preferred for preparing latex polymer for binders for exterior coatings and are useful for other applications, other monoethylenically unsaturated polymerizable monomers useful in minor proportion (i.e. less than 50% by weight of the total monomer composition) as comonomers with acrylic monomers in preparing the initial latex polymer of this invention include the vinylidiene halides, vinyl halides, acrylonitrile, methacrylonitrile, vinyl esters such as vinyl formate, vinyl acetate and vinyl propionate, and mixures of ethylene and such vinyl esters, acrylic and methacrylic acid esters of alcohol ethers such as diethylene glycol monoethyl or monobutyl ether methacrylate, ($C_1$–$C_{10}$)alkyl esters of beta-acryloxypropionic acid and higher oligomers of acrylic acid, styrene and alkyl substituted styrenes and vinyl aromatics including alpha-methyl styrene, mixtures of ethylene and other alkylolefins such as propylene, butylene, pentene and the like, vinyl ethers such as methyl vinyl ether, ethyl vinyl ether, vinyl 2-methoxyethyl ether, vinyl 2-chloroethyl ether and the like. Acrylonitrile is an especially preferred comonomer for the initial latex polymer, Butyl acrylate and acrylonitrile is an especially preferred combination of monomers for the initial latex polymer.

Additional monoethylenically unsaturated polymerizable comonomers useful in preparing the initial latex polymer of the invention include hydroxy functional vinyl monomers such as 2-hydroxyethyl methacrylate, 2-hydroxyethyl acrylate, 3-hydroxypropyl methacrylate, butanediol acrylate, 3-chloro-2-hydroxypropyl acrylate, 2-hydroxypropyl acrylate, and 2-hydroxypropyl methacrylate. Further examples of useful monomers include the partial esters of unsaturated aliphatic dicarboxylic acids and particularly the alkyl half esters of such acids. Examples of such partial esters are the alkyl half esters of itaconic acid, fumaric acid and maleic acid wherein the alkyl group contains 1 to 6 carbon atoms. Representative members of this group of compounds include methyl acid itaconic, butyl acid itaconic, ethyl acid fumarate, butyl acid fumarate, and methyl acid maleate. Minor amounts of other comonomers, such as adhesion promoting comonomers, may also be used. These monomers may be copolymerized with acrylic monomers to yield the initial aqueous dispersion of latex polymer.

Examples of alpha, beta-ethylenically unsaturated carboxylic acids which may be copolymerized with acrylic and other monomers in forming the initial latex polymer of the invention include acrylic acid, beta-acryloxypropionic acid and higher oligomers of acrylic acid and mixtures thereof, methacrylic acid, itaconic acid, aconitic acid, crotonic acid, citraconic acid, maleic acid, fumaric acid, alpha-chloroacrylic acid, cinnamic acid, mesaconic acid and mixtures thereof. Acrylic and methacrylic acids are preferred, and methacrylic acid is especially preferred. It is preferred that alpha, beta-ethylenically unsaturated carboxylic acid comprise from about 0.5 to 5 percent by weight based on the total weight of monomer, of the initial latex polymer monomer composition.

In addition to monoethylenically unsaturated monomer, small proportions of ethylenically monomer having at least two sites of ethylenic unsaturation, that is, di- or multi-ethylenically unsaturated monomer, may be used as comonomer in preparing the initial latex polymer. However, it is not necessary to employ any multi-ethylenically unsaturated monomer. For example, allyl methacrylate or divinyl benzene may be used. Allyl methacrylate is preferred. The initial latex polymer may be prepared from a monomer mixture containing from about 0.005 to 2 percent by weight, based on the weight of the total solids of the initial polymer, of monomer containing at least two sites of ethylenic unsaturation.

Even in those cases in which no di- or multi-ethylenically unsaturated monomer used as comonomer in preparing the initial latex polymer, as is well known in the art, a small proportion of monomer may remain unreacted, or the free radical polymerization of individual polymer chains may terminate with disproportination, polymerization may be incomplete, or other processes may occur which result in the inclusion of a small proportion of sites which are ethylenically unsaturated within the otherwise saturated polymer chain. Polymer which contains such incidental sites of unsaturation is referred to as containing essentially no sites of ethylenic unsaturation in the present specification and claims.

In one embodiment, it is preferred that the initial latex polymer be prepared by emulsion polymerization of alpha, beta-ethylenically unsaturated monomer comprising (a) from about 30 to 99.5 percent by weight, based on the total weight of the solids of the initial latex polymer, of monomer selected from the ($C_1$–$C_{12}$)alkyl esters of acrylic acid, the ($C_1$–$C_{12}$)alkyl esters of methacrylic acid, and mixtures thereof, and (b) from about 0.5 to 10 percent by weight, based on the total weight of solids of the initial latex polymer, of carboxylic acid monomer selected from acrylic acid, methacrylic acid, itaconic acid, beta-acryloxypropionic acid and the higher oligomers of acrylic acid, and mixtures thereof.

In the same embodiment, it is additionally preferred that the alpha, beta-ethylenically unsaturated monomer additionally comprise from about 2 to 15 percent by weight, based on the total weight of the solids of the initial latex polymer, of monomer selected from acrylonitrile and methacrylonitrile, preferably acrylonitrile.

In the same embodiment, it is more preferred that the alpha, beta-ethylenically unsaturated monomer comprise (a) from about 50 to 99 percent by weight, based on the total weight of the solids of the initial latex polymer, of monomer selected from the ($C_1$–$C_{12}$)alkyl esters of acrylic acid, and mixtures thereof, and (b) from about 1 to 5 percent by weight, based on the total weight of the solids of the initial latex polymer, of monomer selected from acrylic acid, methacrylic acid, and mixtures thereof.

In the same embodiment, it is additionally more preferred that the alpha, beta-ethylenically unsaturated monomer additionally comprise from about 0.005 to 2 percent by weight, based on the total weight of the solids of the initial latex polymer, of monomer selected from monomers having at least two sites of ethylenic unsaturation, preferably allyl methacrylate.

While the monomer composition of the initial latex polymer of the compositions of this invention is largely determined by the end-use application in which the composition is to be employed, for exterior coating applications and others, it is preferred that the monomer composition selected to yield an initial latex polymer having a glass transition temperature ($T_g$) characteristics of a random copolymer having a $T_g$ of less than about 20° C. An initial latex polymer with a $T_g$ of less than about −10° C. is more preferred. The $T_g$ of a polymer with a specific monomer composition is determinable in a known manner either experimentally or calculation. The method of calculating the $T_g$ based upon the $T_g$ of homopolymers of individual monomers is described by Fox, *Bull. Am. Physics Soc.* 1,3, pg. 123 (1956). Monomers may be selected to obtain the appropriate $T_g$ through use of the "Rohm and Haas Acrylic Glass Transition Temperature Analyzer", Publication CM-24 L/cb of Rohm and Haas Company, Philadelphia, PA. A low $T_g$ is chosen so that the formulated coating will exhibit good low temperature performance properties. It also is necessary if the coating to have an elastomeric character at ambient temperature. Initial latex polymer with higher $T_g$ may be used; however, it may also be necessary in this case to include additional amounts and types of ingredients in the coating formulation to facilitate film formation, such as coalescents, monomeric and polymeric plasticizers, fugative or reactive coalescents and the like, as are conventional in the coatings art. In roof coating applications, initial latex polymer with a low $T_g$ is preferred, especially initial latex polymer with $T_g$ less than about −20° C. The initial latex polymer may be prepared immediately prior to the addition of the additional ethylenically unsaturated monomer. Alternatively, the initial latex polymer may itself be a commercially available emulsion prepared at some time substantially removed from the addition of the additional monomer. In either case, the initial latex polymer may be referred to as "first stage" polymer and the addition of additional monomer and subsequent polymerization may be referred to as a "second stage" in the process of this invention.

Commercially available emulsions which may be employed as the initial latex polymer are available from a number of manufacturers.

After preparation of the initial aqueous dispersion of latex polymer, the second step in the process of preparing the compositions of this invention may be undertaken. In the second step of this process, additional ethylenically unsaturated monomer comprising at least one monomer having at least two sites of ethylenically unsaturation, wherein said additional monomer has low water-solubility, is dispersed in the initial aqueous dispersion of water insoluble latex polymer. Examples of ethylenically unsaturated monomer having at least two sites of ethylenically unsaturation include ethyleneglycol dimethacrylate, diethyleneglycol dimethacrylate, triethyleneglycol dimethacrylate, polyethylene glycol dimethacrylate, polypropyleneglycol dimethacrylate, neopentylglycol dimethacrylate, 1,3-butyleneglycol diacrylate, neopentylglycol diacrylate, trimethylolethane trimethacrylate, dipentaerythritol triacrylate, dipentaerythritol tetracrylate, dipentaerythritol pentaacrylate, dimethallyl chlorendate, diallyl chlorendate, diallyl fumarate, diallyl itaconate, diallyl phthalate, diallylisophthalate, triallyl isocyanate, triallyl trimellitate, 1,6-hexenediol diacrylate, 1,3-butylene glycol dimethacrylate, trimethylolpropane trimethacrylate, trimethylol propane triacrylate, tripropylene glycol diacrylate, allyl methacrylate, and divinyl benzene.

It is preferred that the additional ethylenically unsaturated monomer comprise at least about 5 percent by weight, based on the total weight of additional ethylenically unsaturated monomer, of monomer having at least two sites of ethylenic unsaturation. It is more preferred that the additional ethylenically unsaturated monomer comprise at least 50 percent by weight, based on the total weight of additional ethylenically unsaturated monomer, of monomer having at least two sites of ethylenic unsaturation. It is especially preferred that the additional ethylenically unsaturated monomer comprise about 100 percent by weight, based on the total weight of additional ethylenically unsaturated monomer, of monomer having at least two sites of ethylenic unsaturation. It is preferred that monomer having at least two sites of ethylenic unsaturation be selected from the group consisting of monomers having two sites of ethylenic unsaturation and monomers having three sites of ethylenic unsaturation. It is also preferred that monomers having two sites of ethylenic unsaturation be selected from the diacrylates and dimethacrylates. It is also preferred that monomers having three sites of ethylenic unsaturation be selected from the triacrylates and trimethacrylates. In another embodiment it is preferred that the monomer having two sites of ethylenic unsaturation be selected from divinyl benzene and aliphatic conjugated dienes. Of the preferred diacrylates and dimethacrylates, diethylene glycol dimethacrylate, ethylene glycol dimethacrylate, 1,6-hexene diol diacrylate, 1,3-butylene glycol dimethacrylate, and tripropylene glycol diacrylate are especially preferred. Of the preferred triacrylates and trimethacrylates, trimethylol propane triacrylate and trimethylol propane trimethacrylate are especially preferred.

Other monomers useful as monomer having at least two sites of ethylenic unsaturation include the reaction products of at least one compound selected from the diisocyanates and triisocyanates, and at least one compound selected from hydroxy($C_1$–$C_6$)alkyl acrylates and the hydroxy($C_1$–$C_6$)alkyl methacrylates. Examples of these include the reaction product of 3-hydroxypropyl methacrylate and 2,4-toluene diisocyanate, and the reaction product of 2-hydroxyethyl acrylate and hexamethylene diisocyanate. Similarly, the reaction products of at least one compound selected from the di- and triepoxy functional compounds and at least one compound selected from acrylic acid and methacrylic acids may be employed. In addition, monomers selected from the reaction products of at least one compound selected from the di($C_1$–$C_4$)alkoxylated ($C_2$–$C_8$)alkanediols, tri($C_1$–$C_4$)alkoxylated ($C_4$–$C_{12}$)alkane triols, and di($C_1$–$C_4$)alkoxylated Bisphenol A, and at least one compound selected from acrylic acid and methacrylic acid may be employed. The reaction product of trimethylol propane and beta-acryloxypropionic acid may also be employed.

It is preferred that the ratio of the weight of solids of the additional ethylenically unsaturated monomer to the weight of solids in the initial latex polymer be from about 1:200 to 1:2. It is more preferred that this ratio be from about 1:100 to 1:4. It is especially preferred that this ratio be from about 1:19 to 1:9.

To some extent the preferred ratio of the weight of solids of the additional ethylenically unsaturated monomer to the weight of solids of the initial latex polymer depends upon the application in which the modified latex polymer is to be employed. In roof mastic applications a ratio of about 1:19 is especially preferred.

Ethylenically unsaturated monomer having at least two sites of ethylenic unsaturation may be referred to as "multifunctional monomer" (MFM). In addition to the multifunctional monomer which may be added to the initial latex polymer during the second step of the process of preparing the compositions of this invention, mono-ethylenically unsaturated monomer may also be employed in this second step with the multifunctional monomer. This may be accomplished by preparing a mixture of mono-ethylenically unsaturated monomer and multifunctional monomer and adding this mixture to the initial aqueous dispersion of water-insoluble latex polymer. Alternatively, multifunctional monomer and monoethylenically unsaturated monomer may be added separately to the initial aqueous dispersion. Examples of mono-ethylenically unsaturated monomer which may be employed include the ($C_1$–$C_{12}$)alkyl esters of acrylic acid, the ($C_1$–$C_{12}$)alkyl esters of methacrylic acid and isobornyl methacrylate. It is preferred that the mono-ethylenically unsaturated monomer employed in this step be selected from methyl methacrylate, butyl methacrylate, butyl acrylate and isobornyl methacrylate. It is preferred that no more than about 95% by weight of the additional ethylenically unsaturated monomer be mono-ethylenically unsaturated monomer.

The additional monomer which is used should be selected such that the additional monomer comprises a substantial proportion of monomer which has low water solubility. Monomers with low water solubility will be preferentially distributed into the hydrophobic phase of the aqueous dispersion, that is, into the water-insoluble latex polymer, wherein it may be subsequently polymerized, Thus, it is desirable to employ monomer with low water solubility as additional momoner. Low levels, less than about 5 weight percent, of water soluble monomers such as ethylenically unsaturated carboxylic acids such as methacrylic acid or acrylic acid may be included in the additional monomer. As the proportion of a monomer included in the additional monomer charge increases, it must be increasingly hydrophobic. Additional monomer containing largely butyl acrylate, ethyl acrylate, methyl methacrylate or a blend thereof, is sufficiently hydrophobic to be used (water solubility about 0.20 g., 1.5 g., and 1.7 g./100 g. water respectively). Some monomers such as diethylene glycol dimethacrylate may be used as additional monomer at room temperature but give coagulation when used at 60° C. Examples of multifunctional monomers which have low water solubility include trimethylolpropane trimethacrylate (water solubility at 25° C.: <0.01 g./100 g. $H_2O$=0.01 wt. %), 1,3-butyleneglycol dimethacrylate (<0.01 wt. %), 1,4-butyleneglycol dimethacrylate (0.07 wt. %), 1,6-hexanediol diacrylate (0.05 wt. %), trimethylolpropane triacrylate (0.17 wt. %), ethyleneglycol dimethacrylate (0.28 wt. %), and diethyleneglycol dimethacrylate (0.33 wt. %). Very water soluble compositions such as hydroxyethyl methacrylate or tetraethylene glycol diacrylate give only coagulation or other evidences of polymerization in the water phase rather than in the first stage particles. A range of monomers which vary widely in hydrophilic/hydrophobic character may be used in the additional monomer blend as long as the hydrophobic/hydrophilic character of the additional monomer blend is balanced so that the additional monomer is polymerized mainly within the first stage polymer rather than in the aqueous phase.

After the additional ethylenically unsaturated monomer is added to the initial aqueous dispersion of latex polymer, sufficient time is allowed to permit the additional monomer to swell the latex particles. The additional monomer which is used may be selected to include only those monomers which have low water solubility. By low water-solubility is meant a solubility in water at ambient temperature of less than about 2 g./100 g. of water (2 wt. %). Preferably, the additional monomer is allowed to swell the initial latex polymer until the monomer swollen initial latex polymer has been swollen essentially to equilibrium with the additional ethylenically unsaturated monomer. The aqueous dispersion may be agitated during the swelling process.

After the initial aqueous dispersion of latex polymer has been swollen essentially to equilibrium, the additional monomer is polymerized within the monomer swollen initial latex polymer. This second polymerization may be initiated by conventional free radical generating initiator systems. Conventional sources of free radicals such as organic peroxides, hydroperoxides, peresters, and persulfates may be employed. Initiating free radicals may be obtained from redox initiator systems. Typical redox initiating systems which may be employed include t-butyl peroxide/Fe(II), t-butyl hydroperoxide/sodium formaldehyde sulfoxylate/Fe(II), t-butyl hydroperoxide/isoasorbic acid, ammonium persulfate/sodium metabisulfite, and t-butyl hydroperoxide/vanadyl sulfate. The t-butyl hydroperoxide/vanadyl sulfate redox system is preferred. In addition to redox initiator systems, free radicals may be obtained from the thermal dissociation of a free radical percursor initiator species such as ammonium persulfate, sodium persulfate, t-butylperoxy pivilate, and t-butyl hydroperoxide. The second step polymerization may be carried out at ambient temperature or at an elevated temperature. The exact monomer composition and polymerization process employed may depend upon the end-use application for which the latex polymer is to be used. For example, the roof mastic applications, a t-butyl hydroperoxide/vanadyl sulfate redox system is preferably used to polymerize the additional monomer. Roof mastics formulated with improved latex polymer so prepared exhibit reduced dirt-pick up during exterior exposure.

The aqueous dispersion of improved water-insoluble latex polymer of the present invention may be used as adhesive, especially in applications in which tack may be sacrificed in favor of enhanced toughness, or the latex polymers may be used in preparing formulated adhesives, and coatings for leather and polyurethane foam as well. In addition, by selecting a monomer composition for the initial water-insoluble latex polymer which is characterized by an appropriate glass transition temperature, the modified latex polymer may be employed in preparing trade sales paint compositions and clear and pigmented wood coatings. In addition, the compositions of the present invention may be used in formulating water-based caulks and sealants.

When the compositions of the present invention are used as polymeric binders for water-based coatings, it may be necessary to add monomeric or polymeric plasticizer or coalescent to the coatings composition to promote film formation, if the glass transition temperature of the polymeric binder is not sufficiently below the temperature at which the fluid coating composition is applied to the substrate to be protected. Thus, in one embodiment this invention yields a toughened polymeric binder for coatings comprising an aqueous dispersion of improved latex polymer prepared by a process disclosed above and optional plasticizer sufficient to reduce the glass transition temperature of the improved latex polymer to less than the temperature of application of the coating, provided that the glass transition temperature of the improved latex polymer is greater than the application temperature of the coating. The plasticizer may have a relatively high vapor pressure and may function as a fugitive coalescent.

Similarly, an aqueous dispersion of improved latex polymer of this invention may be used as an aqueous adhesive, or used as a polymeric binder in formulating adhesive compositions. When used as a toughened adhesive, the glass transition temperature of the improved latex polymer may be at least 5° C. less than the temperature of application of the adhesive. The use of aqueous dispersions of water-insoluble latex polymer in the formulation of water-based coatings for exterior applications, water-based coatings for leather and water-based adhesives is described in H. Warson, *The Applications of Synthetic Resin Emulsions* (Ernest Benn Ltd, London 1972).

The relative amount of latex polymer used in preparing coatings with the compositions of the present invention depends on the desired application. In general, the weight ratio of inorganic pigment to binder may be from 1/1 to about 5/1, preferably about 1/1 to 4/1. In the case of roof coatings (roof mastics), a pigment-to-binder ratio of from about 1/1 to 3/1 may be used with a ratio of about 1.5/1 preferred. It is desirable to maintain the pigment volume concentration below the critical pigment volume concentration, as is well known in the coatings art.

For aqueous latex based mastics, caulks, or sealants of the present invention, the total solids content may be from about 50% to about 90% by weight, preferably from about 60% to about 85%. Solids content is kept as high as possible while yet achieving a useful consistency.

As used in the instant specification and claims, the word "pigment" includes both inorganic materials which are used to impart aesthetic and functional qualities such as rutile and anatase titanium dioxide, and inorganic materials which are used to fill or extend the compositions, such as calcium carbonate ("fillers"), as well as organic materials such as aqueous dispersions of water insoluble polymers which yield air-filled voids on drying of the coating compositions where such voids may contribute to the hiding power of the coating by light scattering, and organic pigments which impart other functional and aesthetic properties to the composition, such as color and texture.

The pigments are present in an amount of from 10 percent to 90 percent by weight of the total solids in coatings composition depending upon the consistency desired, the presence or absence of thickening agents, the amount of identity of solvent utilized, and so forth. Suitable pigments include rutile and anatase titanium dioxide, calcite, limestone, mica, talc, asbestos fiber or powder, diatomaceous earth, barytes, alumina, slate flour, calcium silicate, clay, colloidal silica, magnesium carbonate, magnesium silicate, zinc oxide and so on. The amounts of solvent, if any, pigment, and polymer solids are such as to give caulking compositions a dough-like consistency. Roof mastics have a somewhat thinner consistency with viscosity appoximately 80–120 K.U. (Krebs units).

The pigment used in preparing coatings with the compositions of this invention is dispersed using high speed dispersion equipment such as a Cowles disperser. Anionic polymer, such as polyacrylate or polyphosphate is used as a dispersing aid and in stabilizing the dispersion. Copolymers of acrylic acid and/or methacrylic acid with lower alkyl acrylates are preferred as dispersants. In another preferred embodiment, potassium tripolyphosphate is used to disperse the inorganic pigments. The amount of dispersant used depends on the surface area of the pigment employed per unit volume of the composition. The amount is easily determinable by those skilled in the coatings art by conventional techniques.

The anionic dispersants which may be used are anionically charged polymeric materials used to disperse the inorganic materials used to pigment or fill the coating, roof mastic, caulk or sealant compositions prepared with the aqueous dispersion of latex polymer of the present invention. Sodium tripolyphosphate (CAS Reg. No. 7758-29-4) is a preferred anionic dispersant as is potassium tripolyphosphate. Polyacrylates are also preferred dispersants, and the combination of polyacrylates and polyphosphates are especially preferred. Other types of "condensed" phosphates, that is, dehydrated polymerized orthophosphate in which the $H_2O$ to $P_2O_5$ ratio is less than 3 to 1, may be used. Sulfonated polymers, including naphthaleneformaldehyde sulfonated polycondensates, polymaleates, natural product-derived dispersants, such as tannins, lignins, alignates, gluconates, glucosides, organic phosphonates including methylene phosphonates, may be used. The particular type and amount of dispersant employed may depend on the pigment types and grades selected, and particular grades of certain pigments, for example, titanium dioxide, are available commercially in predispersed form.

Coating compositions prepared using aqueous dispersions of latex polymer of the present invention may be thickened using conventional coatings thickeners as desired. For example, cellulosic thickeners such as methyl cellulose and hydroxyethyl cellulose may be used. Other types of thickeners and rheology modifiers, such as associative hydrophobic alkali soluble emulsions may also be used. The amount of thickener employed depends on the type of coatings product to be prepared, the pigment/binder ratio of the composition, the type and grade of thickener used, the application technique to be used, etc.

Coatings compositions prepared using the present invention may also include conventional coatings ingredients such as can preservatives, antimicrobial agents, mildewicides, anti-freeze agents, coalescents, defoaming agents, colorants, dyes, cosolvents, plasticizers and adhesion promoters.

A variety of application techniques may be employed with coating compositions prepared with the present invention. To some extent, the application technique depends on the viscosity and rheology of the coating composition. The roof mastics of the present invention have a viscosity which is somewhat greater than exterior latex paints; roof mastics may be applied using an airless spray technique. Other techniques, such as application by brush, roller, electrostatic spray, etc., may also be used as appropriate. Caulks may be applied by gunning.

The selection of polymeric binders and other coatings components for leather coatings depends greatly on the intended use of the leather to be finished. Finishes for shoe leather require substantial flexibility and stretch, as the finished leather often must undergo severe mechanical stress and elevated temperature during shoe manufacture. The shoes themselves must withstand constant flexing over wide ranges of temperatures. The polymeric binder employed in a leather finish must remain soft and pliable despite the environmental extremes encountered. In addition, the leather finish must adhere well to the leather itself. In the case of leather basecoats, upon which additional finishing topcoats are applied, the material must adhere to both the leather itself and the topcoating finish. Leather basecoat formulations may contain optional plasticizers, thus the glass transition temperature of the binder polymer may be as high as about 70° C.

The improved water-insoluble latex polymers of the present invention may be employed as binders for leather topcoat and basecoat finishes. In one embodiment, leather basecoat binder may be prepared as an aqueous dispersion of water-insoluble latex polymer by a process comprising (a) preparing by emulsion polymerization an initial aqueous dispersion of a water-insoluble latex polymer polymerized from ethylenically unsaturated monomer comprising from about 30 to 99.5 percent by weight, based on the total weight of solids of the initial latex polymer, of alpha, beta-ethylenically unsaturated monomer selected from the ($C_1$–$C_{12}$)alkyl acrylates and methacrylates and mixtures thereof, wherein the ethylenically unsaturated monomer comprises no more than about one percent by weight, based on the total weight of ethylenically unsaturated monomer, of multi-ethylenically unsaturated monomer, and wherein the water-insoluble latex polymer otherwise contains essentially no sites of ethylenic unsaturation, (b) dispersing in the initial aqueous dispersion of initial water-insoluble latex polymer additional ethylenically unsaturated monomer comprising at least one monomer having at least two sites of ethylenic unsaturation, whereby said additional monomer swells the initial latex polymer, and (c) polymerizing said additional monomer within the monomer-swollen initial latex polymer.

The monomer employed in preparing the initial latex polymer may optionally contain (a) up to about 20 percent by weight, based on the total weight of solids of the initial latex polymer, of carboxylic acid monomer selected from acrylic acid, methacrylic acid, itaconic acid, and beta-acryloxypropionic acid and the higher oligomers of acrylic acid, and mixtures thereof, (b) up to about 30 percent by weight, based on the total weight of solids of the initial latex polymer, of monomer selected from acrylonitrile and methacrylonitrile and mixtures thereof, and/or (c) up to about 60 percent by weight, based on the total weight of solids of the initial latex polymer, of aryl monovinylidene monomer.

The aryl monovinylidene monomer may be styrene or alpha-methyl styrene.

The additional monomer employed may comprise (a) up to about 99% by weight, based on the total weight of additional monomer, of mono-ethylenically unsaturated monomer selected from methyl methacrylate, the ($C_2$–$C_{12}$)alkyl acrylates and methacrylates, and mixtures thereof, and/or (b) up to about 5% by weight, based on the total weight of additional monomer, of carboxylic acid monomer selected from acrylic acid, methacrylic acid, itaconic acid, and beta-acryloxypropionic acid and the higher oligomers of acrylic acid, and mixtures thereof.

Improved cellular foam coatings and molded articles may be prepared from aqueous dispersions of the improved latex polymer of the present invention by a process comprising (1) foaming by high speed mechanical stirring a composition or by use of a chemical blowing agent comprising an aqueous dispersion of improved latex polymer of the present invention, up to 200 percent by weight of inorganic filler such as clay, silica or titanium dioxide, based on the weight of solids of said improved latex polymer, and optional thickener, surfactant and foam stabilizer, (2) drying said foamed composition.

The foamed composition may be applied as a coating and subsequently dried or the foamed composition may be molded into articles. Drying may occur at elevated temperature for relatively short periods (for example, at 100° C. for 10 minutes or less) or at ambient temperatures for longer periods. Drying conditions depends on the article size, film thickness, etc. Dried foams may exhibit a smooth, soft feel and complete recovery when squeezed and the strength to stand alone, when cast into a removable substrate such as release paper. Foams of the present invention are useful as thermal insulating materials when attached to fabric, as filtering media for either gaseous or liquid systems, and as sound-absorbing materials on walls, ceilings or interior surfaces of cabinets containing vibration or noise-emitting systems.

The improved latex polymers of the present invention may be separated from the aqueous medium in which they are polymerized by coagulation, either in batch or continuously, followed by additional steps, such as decantation, filtration, et al. to dewater the coagulated latex polymer. Coagulation may be induced mechanically as by shearing, by the admixing of coagulation agents such as salts or weak acids, by the application of high temperature, by freezing, or by a combination of such techniques.

Improved latex polymers of the present invention may be continuously coagulated and dewatered by means of the equipment and process described in U.S. Pat. No. 3,751,527, line 58 of column 7 to line 15 of column 9, inclusive. Polymer which is extruded through the exit die therein disclosed is collected as gumstock and may be further modified and/or processed in the same manner as is typical of other elastomeric materials. For example, processing may be by molding into shaped articles. This polymer, depending on the composition of the improved latex polymer, may be described as thermoplastic elastomer or thermoplastic semi-elastomer. Alternatively, the extruder outlet may be fitted with a sheet die and the products collected in sheet form by means of cooled takeoff rolls. An especially convenient sheet forming and takeoff system is described in U.S. Pat. No. 3,852,387. The general procedure of example 11 (beginning on line 40 of column 18) is employed to collect the extrudate between oriented poly(ethylene terephthalate) (MYLAR®-Mylar is a trademark of DuPont de Nemours Company) films so that upon cooling, the polymers in sheet form may be easily stripped from the protective MYLAR film. A further useful refinement is the incorporation of reinforcing fibrous material into the sheets as they are formed. Chopped glass or synthetic ornamental fiber roving, fiberglass mat, and non-woven fabric mats and scrims may be pressed into the polymer extrudates as they are formed into sheet by the action of the rolls. It is convenient to feed such reinforcing materials from rolls mounted so as to provide said reinforcing materials as continuous bands. Again, protective films may be employed to facilitate sheet formation and subsequent handling of the reinforced elastomeric sheets. Alternatively, one or both of the surfaces of the formed sheets may be welded to the film surfaces. In these cases the films may be knitted or woven fabrics, patterned and/or decorated films, and the like. The formed sheet products may be wound on spools as continuous sheet or cut to length and/or width on or off line. These extruded, reinforced and/or surface-capped materials also may be patterned on top and/or bottom surfaces by means of rolls which carry suitable embossing patterns. They also may be collected as shaped profiles for yet other applications. These materials also may be collected as high or low density foams by addition of chemical foaming agents or of foaming gases at an additive port of the type shown in FIG. 8 of U.S. Pat. No. 3,751,527 interposed between vent section 7 and the die section E shown in FIG. 7 of said patent.

The gumstock, sheet and profile products have a wide range of applications. The gumstocks may be compression, transfer, or injection molded, with or without the addition of crosslinking agents, to give shaped objects such as shoe heels, shoe soles, shrouds for automobile coil springs, "O" rings, gaskets and the like. Extruded sheet materials may be used as resilient matting, roll roofing membranes, tough, resilient, protective wraps, elastomeric layers for laminated structural materials, bumper strips and the like. Extruded, reinforced sheet materials have somewhat similar uses and are especially useful in roll roofing applications. Foamed sheet is useful in elastomeric insulating and shock absorbing applications. Fabric surfaced sheet is useful in carpeting and upholstery applications, among others. Fabric surfaced, foamed sheet is useful in many applications, including carpeting, and upholstery, but also for automobile headliners and in other areas in which its decorative, sound deadening and shock absorbing properties are exploitable. Profiles are useful in weatherproofing and sealing applications, among others.

In the nomenclature of Sperling, see L. H. Sperling, *Interpenetrating Polymer Networks and Related Material* (Plenum Press, N.Y. 1981), the latex polymer of the present invention may be characterized as "Type II sequential semi-interpenetrating polymer networks" (semi-II IPN) or as "latex IPN"'s.

The initial aqueous dispersion of the water-insoluble latex polymer is made of latex particles which are in turn composed of high molecular weight polymer chains which are at most lightly crosslinked. That is, multifunctional monomers, if included at all in the monomer composition of the initial polymer stage, are present as no more than about 2 percent by weight, based on the total weight of solids of the initial latex polymer. Thus, the elastomeric characteristics of films formed by initial latex polymer are believed to be attributable, for the most part, to entanglement coupling of the high molecular weight polymer chains. The rheology of entanglement networks is reviewed in J. D. Ferry, *Viscoelastic Properties of Polymers* (3rd Ed. John Wiley & Sons 1980) pp. 366 $\propto$ 379. Because of the at most low level of permanent crosslinks in the initial latex polymer particles, they may be considered as not forming a substantial permanent network. On the other hand, the additional monomer which swells the initial latex particles and is subsequently polymerized therein contains multifunctional monomer and is thus believed to form a network of gel structure within the initial particles. Electron micrographs of the improved latex polymer particles reveal that the additional monomer forms a second polymeric phase of discrete domains within the initial particles. It is believed that some interpenetration of the initial polymer with the discrete domains of the second phase occurs; however, this invention is not limited to this or any other explanation of its operation.

Thus, the present invention comprises an aqueous dispersion of improved water-insoluble latex polymer yielding films with increased toughness and hardness, comprising an initial latex polymer and a second polymeric phase in the form of a network of domains or discrete domains dispersed within said initial latex polymer, wherein said second phase is polymerized from ethylenically unsaturated monomer comprising at least about 5 percent by weight, based on the total weight of said ethylenically unsaturated monomer, of multifunctional monomer having at least two sites of -ethylenic unsaturation. It is preferred that the second phase be polymerized from ethylenically unsaturated monomer comprising at least about 50 percent by weight, based on the total weight of said ethylenically unsaturated monomer of multifunctional monomer having at least two sites of -ethylenic unsaturation.

In this embodiment it is preferred that the ratio of the weight of solids of said second polymeric phase to the weight of solids of said initial latex polymer is from about 1:100 to 1:4. Further, it is preferred that the discrete domains of the second polymeric phase have characters of from about 2 to 50 nm and it is especially preferred that the discrete domains of the second polymeric phase have diameter of from about 5 to 25 nm.

The examples given below illustrate several embodiments of the present invention. However, the scope of the invention is in no way limited by the examples given here below.

The following is a list of abbreviations and brand names used below:

| Abbreviations and Trademarks | |
|---|---|
| ALMA | allyl methacrylate |
| AN | acrylonitrile |
| APS | ammonium persulfate |
| BA | butyl acrylate |
| BMA | butyl methacrylate |
| DEGDMA | diethyleneglycol dimethacrylate (ROCRYL 910 monomer) |
| DVB | divinylbenzene |
| DI | deionized |
| EA | ethyl acrylate |
| EHA | 2-ethylhexyl acrylate |
| EGDMA | ethyleneglycol dimethacrylate (ROCRYL 900 monomer) |
| HDODA | 1,6-hexanediol diacrylate (ROCRYL 510 monomer) |
| HYDROHOLAC | trademark of Rohm and Haas Company |
| IAA | isoascorbic acid |
| IBOMA | isobornyl methacrylate |
| IDMA | isodecyl methacrylate |
| LUPERSOL ™ 11 | t-butyl peroxypivilate, Lupersol is a trademark of (Wallace and Tiernan, Inc., Buffalo, N.Y.) |
| LYKOPON ® reducing agent | sodium hydrosulfite, LYKOPON is a registered trademark of Rohm and Haas Company |
| MAA | methacrylic acid |
| MFM | multifunctional monomer |
| MMA | methyl methacrylate |
| NaBS | sodium metabisulfite |
| NaPS | sodium persulfate |
| PRIMAL ® | trademark of Rohm and Haas Company |
| R-970 | 1,3-butyleneglycol dimethacrylate (ROCRYL 970 monomer) |
| ROCRYL ® monomer | registered trademark of Rohm and Haas Co., Philadelphia, PA, for specialty monomers |
| Seed emulsion | BA/EA/MAA prepolymer used as a seed |
| SIPON WD | sodium lauryl sulfate |
| SIPONATE ™ DS-4 | alkyl benzene sulfonate soap |
| SSF | sodium sulfoxylate formaldehyde |
| t-BHP | tertiary butyl hydroperoxide |
| TMPTA | trimethylolpropane triacrylate (ROCRYL 500 monomer) |
| TMPTMA | trimethylolpropane trimethacrylate (ROCRYL 980 monomer) |
| TPGDA | tripropyleneglycol diacrylate |
| TRITON ® | registered trademark of Rohm and Haas Co., Philadelphia, PA, for surfactants |
| TRITON ® X-405 | alkylphenoxy(ethoxy)$_{40}$ alcohol, a surfactant, CAS Registry No. 9036-19-5 |

First Stage Processes

The following examples illustrate the preparation of an unmodified random copolymer of 98 BA/2 MAA.

80° C. Thermal Process (Process Type 1)

A monomer emulsion containing the following materials is prepared:

| DI Water | 760.0 |
|---|---|
| BA | 2156.0 |
| MAA | 44.0 |
| Triton X-405 surfactant | 31.4 |
| Siponate DS-4 surfactant | 9.6 |

Into a 5 liter, four-neck, round-bottomed flask equipped with a stirrer, thermometer, and reflux condenser is charged 1050 g. of DI water which is heated to 83°–86° C. in a nitrogen atmosphere. A cofeed catalyst solution of 2.4 g. Na$_2$CO$_3$/H$_2$O in 162 g. DI water is prepared.

At 83°–86° C. the following materials are charged to the kettle:

| Na$_2$CO$_3$/H$_2$O | 1.5 g./15.0 g. |
|---|---|
| Na$_2$S$_2$O$_8$/H$_2$O | 7.2 g./30.0 g. |
| Seed emulsion (45%) | 126 g. (56.7 g. solids) |
| Rinse water for seed emulsion | 25 g. |

Immediatey after these charges, feeding of the monomer emulsion and the cofeed catalyst solution are begun at a rate calculated to give a 180 minute feed. A temperature of 80°–82° C. is maintained by cooling as required.

Near the end of the monomer emulsion and catalyst solution feeds the following solutions are prepared:

| Neutralizer | 5.0 g. Aq. NH$_3$/15 g. H$_2$O | |
|---|---|---|
| Chaser A | FeSO$_4$ (1% Soln.) | 1.0 g. |
| Chaser B | t-BHP | 0.5 g. |
| | DI H$_2$O | 15.0 g. |
| Chaser C | sodium sulfoxylate formaldehyde | 0.5 g. |
| | DI H$_2$O | 30.0 g. |

When the monomer emulsion and the catalyst solution feeds are complete, the temperature is held at 80°–82° C. for 10 minutes before the neutralizer is added. The reaction is then cooled to 60° C. where chasers A, B and C are added.

The reaction is cooled and filtered through a 100 mesh (0.149 mm seive opening) screen to give an emulsion polymer at a pH of 6.2 and solids of 50%.

60° C. Redox Process (Process Type 2)

A monomer emulsion containing the following materials is prepared:

| DI Water | 760 g. |
|---|---|
| BA | 2156 g. |
| MAA | 44 g. |
| Triton X-405 surfactant | 31.4 g. |
| Siponate DS-4 surfactant | 19.2 g. |

Into a 5 liter, four-neck flask equipped with a stirrer, thermometer, and reflux condenser is charged 1100 g. of DI water which is heated to 60°–62° C. in a nitrogen atomsphere. A cofeed catalyst solution of 6.3 g. t-BHP in 90 g. DI water is prepared.

The following materials are charged to the kettle at 60°–62° C.:

| FeSO$_4$.7H$_2$O soln. (1.0%) | 2.0 g. |
|---|---|
| Seed emulsion (45%) | 126 g. |
| SSF | 4.4 g. in 30 g. DI water |
| Rinse water for seed emulsion | 25 g. |

Immediately after these charges, feedingof the monomer emulsion and the cofeed catalyst solution are begun at a rate calculated to give a feed of 180 minute duration. A temperature of 60°–62° C. is maintained by cooling as required.

Near the end of the monomer emulsion and catalyst solution feeds, the following solutions are prepared:

| Neutralizer | aq. NH$_3$ | 5.0 g. in 15 g. DI water |
|---|---|---|
| Chaser A | t-BHP | 0.50 g. in 15 g. DI water |
| Chaser B | SSF | 0.50 g. in 30 g. DI water |

When the monomer emulsion and catalyst solution feeds are complete, the temperature is held at 60°-62° C. for 15 minutes before the neutralizer is added. The run is allowed to cool slightly (to about 55° C.) while holding for 10 minutes. Chasers A and B are then added. The reaction is cooled and filtered through a 100 mesh screen to give an emulsion polymer at a pH of 8.2 and solids of 50%.

One Shot Room Temperature Redox (Process Type 3)

Into a 5 liter, four neck flask equipped with a stirrer, thermometer, and reflux condenser is charged:

| | |
|---|---|
| DI Water | 1500 g. |
| Siponate DS-4 surfactant | 6.5 g. |
| Triton X-405 surfactant | 7.2 g. |
| BA | 490 g. |
| MAA | 10 g. |

The mixture is warmed to 30° C. while sparging with nitrogen for 30-60 minutes. The mixture is initiated by adding in order:

| | |
|---|---|
| $FeSO_4.7H_2O$ (1% aq. soln.) | 1.5 g. |
| APS | 0.15 g. in 5 g. in DI water |
| Sodium bisulfite | 0.10 g. in 5 g. in DI water |
| Lykopon ® reducing agent | 0.05 g. in 5 g. in DI water |

The polymerization begins in less than 5 minutes and peaks at 66° C., 12 minutes after catalyst addition. The reaction is allowed to slowly cool to 60° C. where chasers of 0.05 g. APS in 5 g. DI $H_2O$ and 0.05 g. NaBS in 5 g. DI $H_2O$ are added. After holding at 60° C. for 15 minutes, the run is cooled and filtered through a 100 mesh screen to given an emulsion polymer at a pH of 2.9 and solids of 24.3%.

Second Stage Processes

The following procedures are used to polymerize the second stages to produce the modified polymers.

t-BHP/SSF at 60° C. (Process Type 1)

To a stirred 500 ml. flask inerted with nitrogen is charged first stage emulsion (A), for example, 380 g of 50% solids emulsion. The material is stirred and heated to 60° C. Second stage monomer (B), for example, ROCRYL 970 monomer for a 5% second stage, 10.0 g., is slowly added. The solids in (A) plus monomers in (B) total 200 g.

At least 30 minutes after adding B, polymerization is initiated at 60° C. by charging (C) 70% active t-BHP, 0.14 g.; (D) 0.10% $FeSO_4.7H_2O$ soln., 0.70 g. and (E) 0.10 g. SSF in 2.0 g. DI $H_2O$. Addition of (C), (D), and (E) produces an exothermic polymerization and the temperature is maintained at >60° C. for 30 minutes. A second charge of (C) and (E) is made to ensure complete polymerization. After about 30 minutes the reaction is filtered through a 100 mesh screen to give the modified emulsion polymer.

t-BHP/Isoascorbic Acid at 60° C. (Process Type 2)

To a stirred 500 ml. flask inerted with nitrogen is charged first stage emulsion (A), for example, 380 g. of 50% solids emulsion. While stirring at ambient temperature, the second stage monomer (B), for example, 10 g. of ROCRYL 970 monomer to give a 5% second stage, is slowly added. The solids in (A) plus monomer in (B) total 200 g. The materials are heated to 60° C.

At least 30 minutes after adding (B), polymerization is initiated at 60° C. by charging (C) 0.06 g. isoascorbic acid in 5 g. DI water, and (D) 0.14 g. 70% active t-BHP in 5 g. DI water. Addition of (C) and (D) produces an exothermic polymerization. The temperature is maintained at >60° C. for 30 minutes. A second charge of (D) is made to ensure complete polymerization. After about 30 minutes, the reaction is filtered through a 100 mesh screen to give the modified emulsion polymer.

t-Butylperoxypivilate (LUPERSOL 11) at 65° C. (Process Type 3)

To a stirred 500 ml. flask inerted with nitrogen is charged first stage emulsion (A), for example, 380 g. of 50% solids emulsion. The material is stirred and heated to 65°-68° C. Second stage monomer (B), for example, 10.0 g. of ROCRYL 970 monomer (for a 5% second stage), is slowly added. The solids in (A) and monomer in (B) total 200 g.

At least 30 minutes after adding (B) and at >60° C., polymerization is initiated by adding (C) 0.11 g of 75% active Lupersol 11 initiator. An exothermic polymerization results and temperature is maintained at >65° C. for more than an hour. The product is filtered through a 100 mesh screen to give the modified emulsion polymer.

APS at 80° C. (Process Type 4)

To a stirred 500 ml. flask inerted with nitrogen is charged first stage emulsion (A), for example, 380 g. of 50% solids emulsion, and 87.0 g. DI water. The material is stirred and heated to 80° C. Second stage monomer (B), for example, 10.0 g. of ROCRYL 970 monomer (for a 5% second stage), is slowly added. The solids in (A) plus monomer in (B) total 200 g.

At least 30 minutes after adding (B) polymerization is initiated at 80° C. by adding (C), 0.08 g of ammonium persulfate in 5.0 g. DI water. An exothermic polymerization occurs and the temperature is maintained at 80° C. for more than 30 minutes. The product is filtered through a 100 mesh screen to give the modified emulsion polymer.

APS/NaBS at Room Temperature (Process Type 5)

To a stirred 500 ml. flask inerted with nitrogen is charged first stage emulsion (A, for example, 380 g. of 50% solids material. While stirring at ambient temperature, the second stage monomer (B), for example, 10.0 g. of ROCRYL 970 monomer (for a 5% second stage), is slowly added. The solids in (A) plus monomer in (B) total 200 g.

At least 30 minutes after adding (B), polymerization is initiated by charging (C), 0.08 g. of sodium metabisulfite in 5 g. DI water, and (D), 0.08 g. ammonium persulfate in 5 g. DI water. Addition of solutions (C) and (D) produces an exothermic polymerization. Stirring is continued for 60 minutes. The reaction product is filtered through a 100 mesh screen to give the modified emulsion polymer.

t-BHP/Fe(II) at Room Temperature (Process Type 6)

To a stirred 500 ml. flask inerted with nitrogen is charged first stage emulsion (A), for example, 380 g. of 50% solids material. While stirring at ambient temperature, the second stage monomer (B), for example, 10.0 g of ROCRYL 970 monomer (for a 5% second stage) is slowly added. The solids in (A) plus monomer in (B) total 200 g.

At least 30 minutes after adding (B), polymerization is initiated by charge (C), 7.2 g. of a 1% aqueous solution of $FeSO_4.7H_2O$, and (D), 0.14 g. of a 70% aqueous solution of t-BHP. An exothermic polymerzation reaction occurs and stirring is continued for at least 30 minutes. A second charge of (D) is made and stirring is continued for another 30 minutes. The reaction product is filtered through a 100 mesh screen to give the modified emulsion polymer.

t-BHP/Vanadium at Room Temperature (Process Type 7)

To a stirred 500 ml. flask inerted with nitrogen is charged the first stage emulsion (A), for example, 380 g. of emulsion at 50% solids. While stirring (A) at ambient temperature, the second stage monomer (B), for example. 10.0 g. of ROCRYL 970 monomer (for a 5% second stage), is slowly added. The solids in A plus monomers in B must total 200 g.

After stirring for 30 minutes, polymerization is initiated by charging (C) 16.0 g. of 3.0% aqueous vanadyl sulfate, and (D) 0.14 g. of 70% active t-BHP. A rapid, exothermic polymerization occurs. After about one hour the reaction product is filtered through a 100 mesh screen to give the modified emulsion polymer.

In the following processes, both stages are prepared in the same flask sequentially.

60° Redox/Vanadium (Process Type L)

To a stirred 5 l. flask equipped with a thermometer, reflux condenser, nitrogen ebullator and pump-driven feed lines is charged 802 g of deionized water and 14.1 g of a 25% aqueous solution of Sipon WD surfactant. The mixture is heated to 50° C., and 60 g of a monomer emulsion prepared from

| DI Water | 218 g. |
|---|---|
| Sipon WD surfactant (25%) | 14.1 g. |
| EA | 518 g. |
| AN | 70 g. |
| AA | 7 g. | is added to the flask.

The mixture is initiated by adding in order

| $FeSO_4.7H_2O$ (0.15% soln.) | 5.5 ml |
|---|---|
| APS | 0.7 g in 4.4 g. DI water |
| Sodium bisulfite | 0.14 g in 2.2 g. DI water |

After the peak isotherm, gradual addition of the balance of the monomer emulsion is begun along with two cofeeds consisting of 0.7 g. APS in 45 g DI water and 0.56 g sodium bisulfite in 45 g DI water. The feeds are completed in two hours while maintaining the temperature at 60° C.

Fifteen minutes after completion of these feeds, residual monomer is chased by successive addition of solutions of 0.56 g., 70% t-BHP in 7.2 g. DI water and 0.26 g SSF in 4.4 g. DI water, followed fifteen minutes later by 3.5 g. styrene, followed, after another fifteen minute period, by solutions of 0.59 g. 70% t-BHP in 2.2 g. DI water and 0.26 g. SSF in 44 g. DI water.

To the first stage emulsion (A) is added at 25° C,

| DI water | 98 g. |
|---|---|
| Sipon WD surfactant (25%) | 9.6 g. |
| MMA | 63 g. |
| ROCRYL 970 monomer | 35 g. |
| AA | 3.5 g. |

The mixture is stirred ten minutes and then initiated by adding 6.9 g. of 10% solution of vanadium (III) 2,4-pentanedionate in toluene. Fifty minutes after the peak isotherm, residual monomer is chased with solutions of 0.56 g. 70% t-BHP in 2.2 g. DI water and 0.26 g. SSF in 4.4 g. DI water. The modified latex is neutralized with 7.1 g. of 20% aqueous ammonia and then filtered through a 100 mesh screen to give 2012 g. of product at 35.2% solids with a pH of 8.4 and viscosity of 15 centipoise. The level of residual A is below 1 ppm.

75° Redox/Fe(II) (Process Type R)

A BA/AN latex copolymer composition prepared with less than about 2.5% by weight of copolymerizable carboxylic acid monomer and having an observed $T_g$ of about $-25°$ C. is prepared by a thermal persulfate initiated, gradual addition, bimodal particle size generating process. The resulting latex polymer has 61.2% solids, pH 4.8, viscosity 540 cps, and is >95% soluble in acetone.

To 2750 g. of this emulsion heated to 45° C. in a nitrogen atmosphere is added 89 g. of ROCRYL 970 monomer emulsified in 20 g. of DI $H_2O$ with 0.10 g. of SIPONATE DS-4 (i.e. 95 first composition//5 additional monomer). After stirring for 20-30 min. to ensure equilibrium of the monomer distribution the additional monomer is polymerized by adding (1) 0.2 g. of 1% $FeSO_4.7H_2O$ solution, (2) 0.52 g. of isoascorbic acid in 5 g of DI water, and (3) 1.0 g of 70% t-BHP in 5 g. of DI water. The reaction exotherms to 48° C. in <5 minutes. After about 30 minutes the t-BHP charge is repeated to ensure high conversion. The resulting latex has 62.7% solids, pH 4.6, viscosity of 930 cps, soluble fraction of 51%, and swell ratio of 47.

Evaluation Procedures

Standard procedures are used to characterize the emulsions. Particle sizes are determined by a quasielastic light scattering technique using a Nano-Sizer ™ particle size analyzer manufactured by Coulter Electronics Inc. The procedures used to determine soluble fraction and gel swell ratio as given below.

The physical properties of films formed by the latex polymer itself in the absence of additves are believed to often be predictive of the properties of latex polymer-containing coating formulations. The latter may also contain substantial amounts and varieties of additional components such as inorganic pigments, colorants and other additives.

Films are cast and allowed to dry two weeks at ambient conditions before properties are determined. Surface tack is rated by touch. Shore A hardness is determined as described by the instrument manufacturer, Shore Instrument Co. of New York, N.Y. Multiple layers of cured polymer film may be necessary to permit meaningful measurement of Shore A hardness. The details of the tensile strength and elongation determinations are given below.

Soluble Fraction/Gel Swell Ratio

The soluble fraction and gel swell ratio are polymer characteristics which are determined using acetone as the solvent. A known weight of polymr (either as the emulsion or as the isolated polymer) is placed in a centrifuge tube along with about 50 times the polymer weight of acetone (e.g., 0.5 g. of polymer in 25 g. acetone in a 50 ml. tube). After shaking, usually overnight, the sample is centrifuged (20,000 rpm for 60-90 min.) to precipitate the insoluble gel. The clear supernate is removed and dried to determine soluble polymer. The gel is redispersed in acetone for at least 4-6 hours and centrifuged again. The clear supernate is removed and dried as before. If the second extraction gives more than about 5% soluble fraction, the extraction is repeated until less than about 5% is found in the supernate. The weights of the polymer in the soluble fractions are summed and the percent soluble fraction is calculated as (weight of soluble polymer/total polymer weight) X 100.

After the last extraction, the weight of the acetone swollen gel is determined and the gel swell ratio calculated as weight of wet gel divided by (total polymer weight-soluble polymer weight).

Film Mechanical Properties

An Instron Tensile Tester is used to measure free-film mechanical properties. Films are cast in polypropylene petri dishes and allowed to dry at least two weeks. The film thickness is 0.035-0.040 inches (0.09-0.10 cm). If required, films are frozen to separate from the dish and/or talc is applied to facilitate handling. A die is used to cut a dog-bone shaped sample having 0.25 in. (0.64 cm) width in the thin area. The ends were wrapped with masking tape before being clamped in the Instron jaws.

The following parameters are used in the Instron tester

| | |
|---|---|
| Crosshead speed: | 1.0 in./min. (2.54 cm./min.) |
| Initial gap: | 0.50 in. (1.27 cm.) |

In general, samples are run in duplicate.
Data reported are:

| | |
|---|---|
| Tensile (max.) | the highest strength observed |
| Tensile (break) | the tensile strengh when the sample breaks |
| Elongation (max.) | the elongation at tensile maximum |
| Elongation (break) | the elongation when the sample breaks |

Uniform Compositions vs. Second stage of Multifunctional Monomer

The data in Table I illustrate single stage uniform compositions and compare them with compositions prepared with MFM second stage modification.

Comparative Example 1 represents a single step emulsion copolymerization of butyl acrylate and methacrylic acid to yield an aqueous dispersion of water-insoluble latex particles.

A single step copolymerization of a low level of a multifunctional monomer with monofunctional monomers is a well known method for improving certain properties of lower $T_g$ emulsion binders, as illustrated by Comparative Example 2. This sample is compositionally identical to Comparative Example 1 except that 5% of the BA has been replaced with ROCRYL 970 monomer. Particular physical properties of this material are compared with those of Comparative Example 1 in Table 1. The soluble fraction and gel swell ratio data obtained from acetone extraction indicate that the one-step copolymerization of the multifunctional ROCRYL 970 monomer with the monofunctional monomers results in a more "crosslinked" system attributable to chemical crosslinking. This sample clearly exhibits improved resistance to acetone compared to Comparative Example 1. A film formed from the emulsion prrepared using one step copolymerization of the monomer mixture containing the multifunctional monomer exhibits a Shore A hardness approximately equal to Comparative Example 1 film, and both exhibit a very high surface tack.

The properties of Example 1 are clearly different from either Comparative Example 1 or Comparative Example 2. The soluble fraction and gel swell ratio based on acetone extraction are both lower than either Comparative Example 1 or Comparative Example 2. This indicates that although the method of this invention does result in an increase in the crosslink density of the latex, it is a different increase than a one-step copolymerization of monofunctional and multifunctional monomers. Surprisingly, although it has a similar crosslink density, films of Example 1 exhibit both higher Shore A hardness and lower surface tack than these of Comparative Example 2. As expected for a system with increased crosslink density, elongational properties are reduced. In this instance elongation is reduced by 50% as compared to Comparative Example 2. However, unlike the Comparative Example, the tensile strength is increased by a factor of 5. Thus, the work function, or area under the stress-strain curve is increased by a factor of about 4 over that of Comparative Example 2. The work function is a measure of the toughness of the film formed.

TABLE 1

Uniform Composition vs. Second Stage of Multifunctional Monomer
First Stage Process 1
Second Stage Process 7
First to Second Stage Ratio: 95//5

| | Comparative Example 1[1] | Comparative Example 2 | Example 1 |
|---|---|---|---|
| Composition: | | | |
| First Stage | 98 BA/2 MAA | 93 BA/5 R-970/2 MAA | 98 BA/2 MAA |
| Second Stage | None | None | R-970 |
| Emulsion Properties: | | | |
| Solids (%) | 50.6 | 49.7 | 50 |
| Viscosity (cps) | 32 | 27 | 26 |
| Particle Size, nm | 310 | 300 | 320 |

TABLE 1-continued

Uniform Composition vs. Second Stage of
Multifunctional Monomer
First Stage Process 1
Second Stage Process 7
First to Second Stage Ratio: 95//5

|  | Comparative Example 1[1] | Comparative Example 2 | Example 1 |
|---|---|---|---|
| Soluble Fraction (%) | 49.8 | 36.1 | 34 |
| Gel Swell Ratio | 43.5 | 19.5 | 10.3 |
| Film Properties: |  |  |  |
| Surface Tack | V. High | V. High | High |
| Shore A Hardness | 0 | 0 | 13 |
| Tensile (max.), psi | — | 17.1 | 77.3 |
| Tensile (break), psi | — | 15.7 | 74.3 |
| % Elongation (max.) | — | 1002 | 504 |
| % Elongation (break) | — | 1052 | 554 |

[1]The film formed by the polymer of Comparative Example 1 is too soft for firm mechanical properties to be determined.

Monofunctional Monomer vs. Multifunctional Monomer for Second Stage

The data in Table II illustrate sequential emulsion polymerization using a monofunctional monomer versus the MFM modification.

Sequential emulsion polymerization is a commonly used method of modifying acrylic emulsion system. In this method, a second monomer charge is polymerized onto or in the presence of a preformed latex. Generally, the second monomer charge is either uncrosslinked or very lighty crosslinked. An example of such prior art is given by Comparative Example 3. This system is prepared by modifying Comparative Example 1 with a second stage of MMA at a solid weight ratio of 90/10. From an examination of the soluble fraction and gel swell ratio based on acetone extraction, it is apparent that there has been essentially no change in the crosslink density of the system. These data also indicate this modification based on prior art exhibits no improvement in acetone resistance. There is essentially no difference in the surface tack or Shore A hardness of these films. This prior art modification does result in an increase in the film tensile strength with a corresponding reduction in elongation compared to the Comparative Example 1 film.

A sample prepared according to this invention results in a material with dramatically different properties. The Example 2 polymer is the polymer of Comparative Example 1 modified with a ROCRYL 970 monomer second stage at a solids weight ratio of 90/10. There is a dramatic decrease in both the soluble fraction and gel swell ratio as determined by acetone extraction. This system is clearly superior to the unmodified system in resistance to acetone. Unlike the modified film based on the monofunctional second stage monomer, the film of this invention exhibits greatly reduced surface tack and an increase in Shore A hardness from 0 to 23. As would be expected for a crosslinked network, a decrease in elongation is noted. The tensile strength, however, increases over that of the unmodified polymer. Moreover, the work function or area under the stress-strain curve exhibits a much greater increase upon modification according to this invention than is observed for the film formed from the emulsion prepared using the monofunctional monomer in the second stage.

TABLE II

Monomer vs. Multifunctional Monomer as the Second Stage
First Stage Compositiion: 98 BA/2 MAA
First Stage Process 1
Second Stage Process 1
First to Second Stage Ratio: 90//10

|  | Comparative Example 1[1] | Comparative Example 3 | Example 2 |
|---|---|---|---|
| Composition: |  |  |  |
| Second Stage | None | MMA | R-970 |
| Emulsion Properties: |  |  |  |
| Solids (%) | 50.6 | 51.9 | 52.7 |
| Viscosity, cps | 32 | 35 | 145 |
| Soluble Fraction (%) | 49.8 | 53.5 | 32.8 |
| Gel Swell Ratio | 43.5 | 49.0 | 9.6 |
| Film Properties: |  |  |  |
| Surface Tack | V. High | High | Moderate |
| Shore A Hardness | 0 | 2 | 23 |
| Tensile (max.), psi | — | 44.1 | 93 |
| Tensile (break), psi | — | 42.4 | 91.4 |
| % Elongation (max.) | — | 938 | 525 |
| % Elongation (break) | — | 996 | 581 |

[1]The film formed by the polymer of Comparative Example 1 is too soft for film mechanical properties to be determined.

Effect of Varying the First Stage Process

The data presented in Table III illustrate the effects of varying the first stage process on emulsions prepared according to this invention and their corresponding films. The basic latex polymer having 98 BA/2 MAA composition is prepared by three different processes and polymers resulting in a range of soluble fraction/swell ratio values. On modification with 5% ROCRYL 970 monomer by the 60° C. t-BHP/IAA process, polymers with the expected properties are produced (cf. Examples 3, 4 and 5). Film elongation is seen to mirror the gel swell ratio; it increases as the film becomes less crosslinked. Shore A hardness and tensile strength are similarly increased compared to the very soft first stage polymers.

Since the emulsion prepared using a one-shot second stage process is so soluble (>98%), the second stage one shot process is further modified (cf. Examples 6 and 7). Both of these polymers show the expected property changes.

The data in Table III demonstrate that a particular first stage process is not required for an effective modification according to this invention.

Effect of Varying the Second Stage Process

Table IV illustrate samples made with a variety of second stage processes. Regardless of the second stage process employed, all of the second staged polymers have improved properties compared to the very soft and weak first stage polymer (see Comparative Example 1 in Table 1). Within this set of processes, the soluble fraction, swell ratio, and film properties may be used to rank the effectiveness of the second stage process. Thus, the t-BHP/vanadium room temperature process (Process 7) is seen to give the lowest SF/SR, lowest elongation, and highest tensile strength and Shore A hardness. The other redox systems (t-BHP/SSF at 60° C., t-BHP/IAA at 60° C., AAPS/NaBS at room temperature, t-BHP/Fe at room temperature; Processes 1, 2, 5 and 6) give intermediate values. The least effective second stage processes are the thermal system (Lupersol 11 at 65° C., APS at 80° C., Processes 3 and 4).

The data in Table IV demonstrate that a particular process for the second stage polymerization is not required to produce the modification of this invention. However, it is also clear that the process does influence the properties obtained and that selection and control of the process are important in obtaining emulsions and films with desired application characteristics.

TABLE III

Effect of Varying the First Stage Process
First Stage Composition: 98 BA/2 MAA
Second Stage Composition: ROCRYL 970 Monomer
First to Second Stage Ratio: 95/5
(except Example 7, 90//10)

| Example | 3 | 4 | 5 | 6 | 7 |
|---|---|---|---|---|---|
| Emulsion Properties: | | | | | |
| First Stage Process: | 2 | 1 | 3 | 3 | 3 |
| Soluble Fraction (%) | 43.9 | 49.8 | 98.5 | 98.5 | 98.5 |
| Gel Swell Ratio | 13.1 | 43.5 | — | — | — |
| Second Stage: | | | | | |
| Process | 2 | 2 | 2 | 7 | 7 |
| Solids (%) | 50.1 | 49.7 | 24.7 | 23.7 | 24.8 |
| Viscosity, cps | 35 | 25 | 8 | 5 | 5 |
| Particle Size, nm | 310 | 347 | 89 | 127 | 132 |
| Soluble Fraction (%) | 37.1 | 41.7 | 96.9 | 71 | 36.2 |
| Gel Swell Ratio | 9.9 | 22.5 | — | 37.5 | 20.7 |
| Film Properties: | | | | | |
| Surface Tack | High | High | High | High | Low |
| Shore A Hardness | 3 | 8 | 12 | 13 | 45 |
| Tensile (max.), psi | 40 | 49 | 78.4 | 65.3 | 116.4 |
| Tensile (break), psi | 39 | 44.5 | 36 | 51.1 | 89 |
| % Elongation (max.) | 416 | 861 | 1465 | 543 | 126 |
| % Elongation (break) | 448 | 926 | 3485 | 1137 | 299 |

[1] All films formed from first stage emulsions are too soft for mechanical properties to be determined.

TABLE IV

Effect Of Varying the Multifunctional Monomer
Second Stage Process
First Stage: Composition: 98 BA/2 MAA Process 1
Second Stage: Composition: ROCRYL 970 Monomer
First to Second Stage Ratio: 95//5

| Example | 1 | 4 | 8 | 9 | 10 | 11 | 12 |
|---|---|---|---|---|---|---|---|
| Second Stage Process Code | 7 | 2 | 6 | 5 | 1 | 3 | 4 |
| Emulsion Properties: | | | | | | | |
| Solids (%) | 50 | 49.5 | 49.3 | 49.6 | 51.2 | 52.1 | 35.7 |
| Viscosity, cps | 26 | 25 | 22.5 | 25 | 32.5 | 35 | 7.5 |
| Soluble Fraction (%) | 34 | 41.7 | 43.6 | 45.6 | 36.5 | 45.6 | 47.8 |
| Gel Swell Ratio | 10.3 | 22.5 | 18.2 | 24.3 | 20 | 25.8 | 28.8 |
| Film Properties: | | | | | | | |
| Surface Tack | High | High | High | High | High | V. High | V. High |
| Shore A Hardness | 13 | 8 | 2 | 5 | 6 | 5 | 3 |
| Tensile (max.), psi | 77.3 | 49 | 58.8 | 47.7 | 69.4 | 35.2 | 37.8 |
| Tensile (break), psi | 74.3 | 44.5 | 53.5 | 45.8 | 65.9 | 32.4 | 35.6 |
| % Elongation (max.) | 504 | 861 | 845 | 642 | 915 | 710 | 1190 |
| % Elongation (break) | 554 | 926 | 905 | 760 | 970 | 790 | 1265 |

Effect of Varying the First Stage Composition

The data in Table V demonstrate the effect of varying the first stage composition and show the result of modification with 5 parts of ROCRYL 970 monomer. The first stage variables include a range of $T_g$'s, combinations of acrylate, methacrylate, and acrylonitrile monomer composition, and compositions lightly crosslinked with ALMA. In every case, soluble fraction, gel swell ratio, surface tack and elongation are reduced while tensile strength and Shore A hardness are increased. Clearly, modification by the process of this invention is effective with a wide range of polymer compositions.

Effect of Varying Second Stage Multifunctional Monomers

The results reported in Table VI illustrate the range of multifunctional monomers which may be used in the process of this invention. The MFMs include various di- and tri-acrylates and methacrylates and vinyl compounds. In each instance, 95 parts of the polymer of Comparative Example 1 has been modified with 5 parts of the MFM catalyzed by t-BHP/vanadium at room temperature (Process 7). In each case soluble fraction, gel swell ratio, and elongation are decreased while tensile strength and Shore A hardness are increased. However, the actual balance of properties varies among the samples. The films formed by the polymers of Examples 25 and 27 (diacrylates) exhibit higher surface tack and lower Shore A hardness than the others even though the soluble fraction and gel swell ratio are not very different. The films formed by the polymers of Examples 22 and 23 (long chain dimethacrylates) retain high elongation while tensile strength is high. Indeed, the film formed by the polymer of Example 23 gives the best balance of low surface tack, high Shore A hardness, high tensile and high elongation. The trifunctional monomers give the lowest gel swell ratios and elongation reflecting the higher crosslinking density (Examples 24 and 26). The vinyl compound, divinyl benzene, performs well as a MFM, as judged by the balance of film properties exhibited.

TABLE V

Effect of Varying First Stage Compositions
with a ROCRYL 970 Second Stage
First Stage Process 1
Second Stage Process 7
Second Stage Composition: ROCRYL 970
First to Second Stage Ratio: 95/5

| Example | 13[1] | | 1[1] | | 4[1] | | 15 | |
|---|---|---|---|---|---|---|---|---|
| First Stage Composition | 50 EHA/48 BA/2 MAA | | 98 BA/2 MAA | | 86 BA/12 MMA/2 MAA | | 73 BA/25 MMA/2 MAA | |
| Calc'd 1st Stage Tg[3] | −67° C. | | −52° C. | | −40° C. | | −25° C. | |
| Stage | First | Second | First | Second | First | Second | First | Second |
| Emulsion Properties: | | | | | | | | |
| Solids (%) | 45.8 | 45.3 | 50.6 | 50 | 50.5 | 50 | 50.5 | 49.9 |
| Viscosity, cps | 22 | 16 | 32 | 26 | 30 | 23 | 29 | 23 |
| Particle Size, nm | 210 | 230 | 310 | 320 | 290 | 300 | 290 | 300 |
| Soluble Fraction (%) | 35.5 | 26.3 | 49.8 | 34 | 63.2 | 31.2 | 62.9 | 35.2 |
| Gel Swell Ratio | 13.9 | 6.4 | 43.5 | 10.3 | 41.2 | 9.3 | 39.6 | 9.5 |
| Film Properties: | | | | | | | | |
| Surface Tack | V. High | High | V. High | High | High | Moderate | Moderate | Low |
| Shore A Hardness | 0 | 27 | 0 | 13 | . | 25 | 12 | 30 |
| Tensile (max.), psi | . | 103.7 | . | 77.3 | . | 101.8 | 61.1 | 180.3 |
| Tensile (break), psi | . | 96.2 | . | 74.3 | . | 93.4 | 16.6 | 69.2 |
| % Elongation (max.) | . | 188 | . | 504 | . | 380 | 1703 | 388 |
| % Elongation (break) | . | 238 | . | 554 | . | 465 | 2507 | 668 |

| Example | 16[2] | | 17[2] | | 18 | | 19 | |
|---|---|---|---|---|---|---|---|---|
| First Stage Composition | 48 BA/50 MMA/2 MAA | | 48 EA/50 MMA/2 MAA | | 86 BA/12 AN/2 MAA | | 97.8 BA/2 MAA/0.2 ALMA | |
| Calc'd 1st Stage Tg[3] | +8° C. | | +32° C. | | −40° C. | | −52° C. | |
| Stage | First | Second | First | Second | First | Second | First | Second |
| Emulsion Properties: | | | | | | | | |
| Solids % | 50.7 | 50 | 50.8 | 50.3 | 49.1 | 48.8 | 50.5 | 49.9 |
| Viscosity, cps | 25 | 21 | 23 | 160 | 28 | 20 | 33 | 25 |
| Particle size, nm | 316 | 330 | 280 | 280 | 290 | 290 | 290 | 310 |
| Soluble Fraction (%) | 52.8 | 38.2 | 50.8 | 43.6 | 93.3 | 45.1 | 13.1 | 10.6 |
| Gel Swell Ratio | 15.9 | 9.2 | 25 | 15.4 | 38.8 | 14.5 | 6.1 | 5.1 |
| Film Properties: | | | | | | | | |
| Surface Tack | V. Low | V. Low | V. Low | V. Low | High | Low | V. High | High |
| Shore A hardness | 68 | 75 | 76 | 85 | 12 | 40 | 2 | 15 |
| Tensile (max.), psi | . | . | . | . | 36.1 | 172.7 | 15.2 | 75 |
| Tensile (break), psi | . | . | . | . | 6.5 | 19 | 14.7 | 68.8 |
| % Elongation (max.) | . | . | . | . | 1480 | 548 | 202 | 238 |
| % Elongation (break) | . | . | . | . | 4915 | 1247 | 213 | 265 |

| Example | 20[1] | | 21[1] | |
|---|---|---|---|---|
| First Stage Composition | 97.85 BA/2 MAA/.05 ALMA | | 58 BA/40 IDMA/2 MAA | |
| Calc'd 1st Stage Tg[3] | −52° C. | | −47° C. | |
| Stage | First | Second | First | Second |
| Emulsion Properties: | | | | |
| Solids (%) | 50.3 | 49.9 | 49.8 | 48.1 |
| Viscosity, cps | 21 | 25 | 33 | 26 |
| Particle Size, nm | 290 | 290 | 310 | 320 |
| % Soluble Fraction | 25.1 | 21 | 51.6 | 33.3 |
| Gel Swell Ratio | 13.2 | 11.4 | 30.4 | 8.2 |
| Film Properties: | | | | |
| Surface Tack | V. High | High | V. High | High |
| Shore A Hardness | 0 | 10 | 0 | 9 |
| Tensile (max.), psi | — | 67 | — | 84.3 |
| Tensile (break), psi | — | 58.9 | — | 70.4 |
| % Elongation (max.) | — | 405 | — | 635 |
| % Elongation (break) | — | 425 | — | 695 |

[1]The films formed by the first stage unmodified polymers of Examples 1, 4, 13, 20 and 21 are too soft for the determination of film mechanical properties.
[2]The films formed from Examples 16 and 17 are too brittle for the determination of film film mechanical properties.
[3]Tg calculated from monomer composition

TABLE VI

Effect of Varying the Second Stage Multifunctional Monomer
First Stage Composition: 98 BA/2 MAA
First Stage Process: 1
Second Stage Process: 7
First to Second Stage Ratio: 95/5

| Example | Comp.[2] Ex. 1 | 1 | 22 | 23 | 24 | 25 | 26 | 27 | 28 |
|---|---|---|---|---|---|---|---|---|---|
| Second Stage Composition | None | R-970 | EGDMA | DEGDMA | TMPTMA | HDODA | TMPTA | TPGDA | DVB |
| Emulsion Properties: | | | | | | | | | |
| Solids (%) | 50.6 | 50 | 50.1 | 50.2 | 49.9 | 50.1 | 50 | 49.8 | 50.2 |
| Viscosity, cps | 32 | 26 | 30 | 26 | 25 | 25 | 25 | 27 | 27 |
| % Soluble Fraction | 49.8 | 34 | 30.9 | 35.7 | 30.3 | 34.5 | 29.4 | 39.6 | 31.9 |
| Gel Swell Ratio | 43.5 | 10.3 | 10.1 | 14.6 | 8.1 | 14 | 6.3 | 17.7 | 11.8 |
| Film Properties: | | | | | | | | | |
| Surface Tack | V. High | High | High | Moderate | High | V. High | High | V. High | High |
| Shore A Hardness | 0 | 13 | 8 | 22 | 8 | 2 | 17 | 5 | 10 |
| Tensile (max.), psi | . | 77.3 | 87.2 | 86.7 | 80.9 | 44.9 | 119.5 | 85.2 | 63.7 |
| Tensile (break), psi | . | 74.3 | 84.6 | 76.1 | 78.9 | 40.7 | 113.9 | 70 | 57.8 |
| % Elongation (max.) | . | 504 | 712 | 978 | 418 | 730 | 232 | 980 | 628 |
| % Elongation (break) | . | 554 | 752 | 1045 | 438 | 762 | 250 | 1018 | 660 |

[1]The film formed by the polymer of Comparative Example 1 is too soft for film mechanical properties to be determined.
[2]Com. Ex. = Comparative Example

Effect of Varying the Level of MFM Second Stage

The effects of varying the level of second stage modification are presented in Table VII. The level of crosslinked second stage relative to the first stage emulsion has a significant effect on the ultimate balance of properties of the modified polymer. Typically, lower levels of the crosslinked second stage (i.e., 1-3%) result in a significant increase in the tensile strength of the cured films with only minor reduction in elongation. The reduction in soluble fraction as determined by acetone extraction indicates an increase in crosslink density. There is also a corresponding decrease in the gel swell ratio. At about 99 parts first stage polymer/1 part MFM polymer, the effect of the modification becomes minimal. This limit may be influenced by the particular first stage being modified. A more functional, smaller soluble fraction, smaller swell ratio first stage shows significant responses at 1%, while less functional, larger soluble fraction, larger swell ratio first stages require proportionally more MFM modification.

At higher levels of the second stage there is a greater decrease in the film elongation properties with a corresponding increase in tensile strength. The addition of higher multifunctional levels results in a further decrease in soluble fraction. More significantly, a large reduction in the gel swell ratio is noted at higher levels of the crosslinked second stage. Shore A hardness also is seen to increase significantly as the level of MFM in the composition is increased.

The level of MFM second stage required to give the property improvements associated with the process of this invention begin at about 1% and continue to above 10%. Compositions with too large a MFM second stage will lose their ability to form a film. The ability to form a film will also be reduced by increasing the base polymer $T_g$, that is, $T_g$, that is, further $T_g$ first stages accept less MFM second stage. Film formation may be enchanced by the addition of a coalescent, as is well known in coatings systems. Thus, the maximum level of MFM is influenced by a number of independent factors; however, compositions having up to 15-20% MFM second stage exhibit desirable properties.

TABLE VII

Effect of Varying the Level of the
ROCRYL 970 Second Stage
First Stage Composition: 98 BA/2 MMA
First Stage Process: 1
Second Stage Composition: ROCRYL 970
Second Stage Process: 7

| Example | 29 | 1 | 30 | 31[1] | Comparative Example 1[1] |
|---|---|---|---|---|---|
| Stage Ratio | 90//10 | 95//5 | 97//3 | 99//1 | 100//0 |
| Emulsion Properties | | | | | |
| Solids (%) | 50.8 | 50 | 50.2 | 48.5 | 50.6 |
| Viscosity, cps | 27.5 | 26 | 27.5 | 20 | 32 |
| Soluble Fraction (%) | 29.3 | 34 | 40.6 | 48.9 | 49.8 |
| Gel Swell Ratio | 7.6 | 10.3 | 23 | 42.7 | 43.5 |
| Film Properties: | | | | | |
| Surface Tack | Low | High | V. High | V. High | V. High |
| Shore A Hardness | 37 | 13 | 0 | 0 | 0 |
| Tensile (max.), psi | 161.1 | 77.3 | 59.3 | — | — |
| Tensile (break), psi | 157.4 | 74.3 | 52.2 | — | — |
| % Elongation (max.) | 215 | 504 | 1108 | — | — |
| % Elongation (break) | 262 | 554 | 1164 | — | — |

[1]The films formed by the polymers of Example 31 and Comparative Example 1 are too soft for film mechanical properties to be determined.

Effect of Varying the Monomer/MFM Second Stage

Modification of emulsion polymers by method of this invention does not require that the second stage be composed entirely of multifunctional monomer. As seen in Table VIII, it is only necessary that a sufficient level of copolymerized multifunctional monomer be present to form a sufficiently well-crosslinked network. The copolymerized monofunctional monomers illustrated are esters of acrylic and methacrylic acids; however, others could be used.

The results reported in Table VIII demonstrate the effect of adding a second stage of variable monomer $T_g$ and variable second stage monomer/MFM ratio. All of the modified polymers have properties which indicate a successful preparation. With a second stage 80 monofunctional monomer/20 ROCRYL 970 monomer, the low $T_g$ (soft) monomers are seen to give high tack and low tensile strength polymer films; increasing $T_g$ reduces tack and increases tensile strength. The films formed from the polymers prepared using the hard monomers, MMA and IBOMA, show similar properties when measured at ambient conditions (i.e., below their $T_g$'s). Reducing the level of ROCRYL 970 monomer in the MMA/R-970 second stage only slightly influences the soluble fraction, gel swell ratio, tack, and tensile strength; Shore A hardness is decreased while elongation is increased.

A second stage containing a moderate level (about 5% and above) of a multifunctional monomer is shown to provide the advantages associated with the process of this invention AA) prepared according to Process L. A comparative example basecoat (Comp. Ex. L2) is prepared using the same formulation and an emulsion prepared using Process L but with MMA substituted for 1,3-butyleneglycol dimethacrylate in the second stage.

The basecoats are applied to corrected grain, shoe-upper leathers, followed by a standard nitrocellulose topcoat (HYDRHOLAC WC-300), and are then evaluated with respect to ten leather performance properties using a number ranking system (1=best). Results are summarized in Table IX.

TABLE IX

| Leather Performance Properties | Basecoat | |
|---|---|---|
| | L1 | L2 |
| Ease of Basecoat Application (pad) | 1 | 2 |
| Plate Release[1] | 1 | 2 |
| Appearance (Finished Leather) | 1 | 1 |
| Wet Crock (Basecoat)[2] | 1 | 1 |
| Wet Crock (Finished Leather)[2] | 1 | 2 |
| Wet Soak (Finished Leather)[3] | 1 | 2 |
| Tape Adhesion (Finished Leather)[4] | 1 | 1 |
| Toluene Rub (Finished Leather)[5] | 1 | 2 |
| Bally Flex (Dry, Finished Leather)[6] | 2 | 1 |
| Bally Flex (Wet, Finished Leather)[7] | 2 | 1 |

[1]Sand blast or satin plate, 170°-190° F.
[2]Textile crock meter; wet cloth/dry sample; 100 cycles or cycles to first damage.
[3]Textile Crock Meter; wet cloth/sample soaked 30 minutes in water.
[4]One square inch crosshatched area; Scotch ® (trademark of 3M Company) tape,

TABLE VIII

Effect of Varying Monomer/Multifunctional Monomers Ratios in the Second Stage
First Stage Composition: 98 BA/2 MAA
First Stage Process: 1
Second Stage Composition: Variable
Second Stage Process 7
Stage Ratio: 90/10

| Example | Comparative Example 1[1] | 32 | 33 | 34 | 35 | 36 | 37 |
|---|---|---|---|---|---|---|---|
| Second Stage Composition | None | 80 BA/ 20 R-970 | 80 BMA/ 20 R-970 | 80 IBOMA/ 20 R-970 | 80 MMA/ 20 R-970 | 90 MMA/ 10 R-970 | 95 MMA/ 5 R-970 |
| Emulsion Properties: | | | | | | | |
| Solids (%) | 50.6 | 51.5 | 50.7 | 51.2 | 51.4 | 51.4 | 50.3 |
| Viscosity, cps | 32 | 34 | 34 | 36 | 32 | 32 | 28 |
| Soluble Fraction (%) | 49.8 | 38.4 | 36 | 36.6 | 33.7 | 35.4 | 41.0 |
| Gel Swell Ratio | 43.5 | 19.9 | 13.3 | 14 | 13.3 | 16.8 | 16.7 |
| Film Properties: | | | | | | | |
| Surface Tack | V. High | V. High | V. High | High | High | High | High |
| Shore A Hardness | 0 | 0 | 2 | 8 | 15 | 12 | 8 |
| Tensile (max.), psi | . | 22.2 | 37.1 | 47.7 | 76.1 | 81.1 | 87.7 |
| Tensile (break), psi | . | 21.7 | 36.3 | 46.7 | 74.9 | 80.8 | 86.5 |
| % Elongation (max.) | . | 847 | 776 | 738 | 771 | 986 | 1292 |
| % Elongation (break) | . | 868 | 821 | 772 | 808 | 1035 | 1338 |

[1]The films formed by the polymer of Comparative Example 1 is too soft for film mechanical properties to be determined.

Leather Basecoat Application0 Comparison with A Conventional Emulsion Containing MMA As The Second Stage

| Basecoat Formulation For Corrected Grain, Shoe Upper Leathers | |
|---|---|
| Component | Wt. % |
| Water | 31.5 |
| Primal Binder C-7 (Wax) | 3.5 |
| Primal Dull 140 (Dulling Agent) | 8.7 |
| Experimental Emulsion | 33.6 |
| Primal Black 110 (Pigment) | 21.0 |
| Aqueous Ammonia (28%) | 1.7 |
| Binder/Pigment Ratio: 2.1:1 | |
| Total Solids: 17.9% | |

A leather finishing basecoat (Example L1) is prepared according to the above formulation with emulsion 74 EA/10 AN/1 AA//0.5 Sty//14 BGDMA/0.5 fast peel.
[5]Three drops of toluene applied to flesh side of leather; 1 minute soak cycles to first damage as measured on textile crock meter.
[6]Damage to finished leather (cracking, delamination) after 40,000 cycles on Bally Flexometer.
[7]Sample soaked 30 minutes in water and then subjected to 40,000 cycles on Bally Flexometer.

For basecoat applications, plate release, water resistance (wet crock, wet soak, water absorption), solvent resistance, and finish adhesion are the most critical performance properties. The composition at the present invention is equal to or better than the control in all of these areas. In the flexibility tests, the leather basecoated with the formulated leather finish of the present invention is judged to be slightly poorer than the control, but is still considered to be fully satisfactory.

A comparison of the free film properties of the two emulsions further demonstrates that the example of the present invention composition prepared by Process L is stronger and more extensible than the control, with superior solvent resistance.

TABLE X

Free Film Properties: Leather Basecoat Emulsions

|  | Emulsion of L1 | Emulsion of L2 |
|---|---|---|
| Tensile Strength (max., psi) | 2300 | 1620 |
| Percent Elongation (at max.) | 700 | 515 |
| Percent Water Absorption | 15.3 | 14.0 |
| Swell Ratio (Toluene) | 13.7 | dissolves |
| Swell Ratio (Acetone) | 15.9 | dissolves |
| $T_{300}$° C.,[1] | +13 | +10 |

[1]$T_{300}$ is a measure of the glass transition temperature obtained from measuring the torsional modulus of a glass fiber braid impregnated with polymer as a function of temperature.

Roof Mastic Application

A roof mastic is prepared, using an emulsion of an improved latex polymer polymerized by Process Type R, according to the following formulation:

Roof Mastic Formulation

| Component | g./l. |
|---|---|
| Hydroxyethyl cellulose (Natrosol 250 MXR[1] 3% by weight in water) | 155.8 |
| Pigment dispersant (Tamol 850[2]) | 3.0 |
| Ethylene glycol | 30.7 |
| Defoamer (Nopco NXZ[8]) | 2.4 |
| Potassium tripolyphosphate (pigment dispersant) | 0.89 |
| TiO$_2$ (TiPure R-960[3]) | 42.3 |
| CaCO$_3$ (Camel Wite[4]) | 266.9 |
| Zinc oxide (Kadox 515[5]) | 16.3 |

The above components are ground for 15 minutes on a high speed disperser (Cowles) and the following components are added:

| | |
|---|---|
| Latex polymer of Process R | 545.4 |
| Coalescent (Texanol[6]) | 8.7 |
| Mildewicide (Skane M-8[7]) | 2.6 |
| Defoamer (Nopco NXZ[8]) | 2.4 |
| NH$_4$OH (28% NH$_3$) | 1.2 |

[1]Natrosol is a trademark of Hercules, Inc. of Wilmington, DE
[2]Tamol is a trademark of Rohm and Haas Company. Tamol 850 is a nonionic surfactant type dispersant.
[3]TiPure is a trademark of DuPont deNemours Co., Wilmington, DE.
[4]Camel Wite is a trademark of Harry T. Campbell Sons Corp. of Towson, MD.
[5]Kadox is a registered trademark of New Jersey Zinc, Bethlehem, PA
[6]Texanol ia a registered trademark of Eastman Kodak Co., Rochester, N.Y.
[7]Skane is a registered trademark of Rohm and Haas Company.
[8]Nopco is a registered trademark of Diamond Shamrock Corp.

The mix is then ground for an additional 15 minutes. The pigment to binder ratio is 1.00.

The mechanical properties of films of cured roof mastic are evaluated by casting a film on a TEFLON (trademark of DuPont de Nemours) coated glass plate to yield a dry film with a thickness of 0.05 cm (0.02 inches). The cast mastic is allowed to dry for 2 weeks at 77° F. and 50 relative humidity. When cure is complete, test specimens are cut from the film using the dumbbell shaped die (7.62 cm long×1.91 cm wide with neck width of 0.64 cm) used in preparing polymer free film test specimens described above. An Instron Tensile Tester is used to measure the mechanical properties.

A roof mastic prepared using the above formulation has a tensile strength of 203 psi (14.3 Kg/cm$^2$) and an elongation of 755% when tested at ambient temperature (21° C.) and a tensile strength of 1112 psi (78.2 Kg/cm$^2$) and an elongation of 480% when tested at 0° F. (−18° C.). A commercial roof mastic cured and tested in the same manner showed a tensile strength of 165 psi (11.6 Kg/cm$^2$) and an elongation of 190% when tested at ambient temperature and a tensile strength of 370 psi (26.0 Kg/cm$^2$) and an elongation of 232% when tested at 0° F.

The improved latex polymer of the present invention yields roof mastic of improved tensile strenght and elongation.

| Latex Foam Application Component | Foam Formulation Function | Amount |
|---|---|---|
| Emulsion polymer (50% solids) | binder | 190.0 g |
| TiO$_2$ | filler | 50.0 g |
| aluminum hydrate | filler | 142.0 g |
| melamine resin[1] (AEROTEX[2] 3030) | coresin | 7.5 g |
| ammonium nitrate | melamine resin catalyst | 4.5 g |
| ammonium stearate | foam stabilizer | 4.0 g |
| disodium n-octadecyl sulfosuccinamide | drying aid | 1.8 g |
| CELLOSIZE[3] CP-40 | cellulosic thickener | 1.5 g |
| water |  | 9.0 g |
| isopropanol[1] | drying aid | 9.0 g |
| acetone[1] | drying aid | 9.0 g |

[1]Optional ingredient
[2]AEROTEX is a trademark of American Cyanamid Co., Wayne, N.J.
[3]CELLOSIZE is a trademark of Union Carbide Corp., Danburgy, CT.

The above ingredients, including the emulsion polymer of Example 18 above, are added in the sequence given above and mixed stirring only as necessary to yield a homogeneous mixture. After addition of the ammonium nitrate the pH is adjusted to between 8.0 and 8.5 and the slurry is transferred to a high speed mechanical mixer when it is whipped to a density of about 0.3 g.l cm$^3$.

A Gardner Knife is used to coat the resulting foam on to silicone release paper at a thickness of 0.075" (0.19 cm) and the foam is dried at 100° C. for 10 minutes. The resulting self-supporting foam may be used as a particulate filter for either liquids or gases.

We claim:

1. An aqueous polymeric dispersion prepared by the process comprising
   (a) emulsion polymerizing at least one mono-ethylenically unsaturated monomer to form an initial dispersion of initial water insoluble latex polymer containing essentially no sites of ethylenic unsaturation,
   (b) dispersing ethylenically unsaturated monomer including monomer having at least two sites of ethylenic unsaturation into said initial dispersion whereby said dispersed monomers swells said dispersed said initial latex polymer,
   (c) polymerizing said dispersed ethenically unsaturated monomer within said monomer-swollen initial latex polymer; and
   (d) where the final composition of said latex polymer containing said polymerized ethylenically unsaturated monomer dispersed in said initial latex polymer comprises from about 67 to about 99 percent by weight initial latex polymer and from about 33 to about 1 percent by weight polymerized ethylenically unsaturated polymer dispersed therein.

2. An aqueous polymeric dispersion according to claim 1 wherein said mono-ethylenically unsaturated monomer is an α,β-ethylenically unssaturated monomer.

3. An aqueous polymeric dispersion according to claim 1 wherein said initial latex polymer is swollen essentially to equilibrium with said dispersed monomer prior to polymerizing said dispersed monomer within said monomer-swollen initial latex polymer.

4. The polymeric dispersion of claim 1 wherein said dispersed monomer comprises at least about 50 percent by weight, based on the dispersed monomer, of monomer which has a solubility in water at 20° C. of less than about 0.2 g. per 100 g. of water.

5. The polymeric dispersion of claim 4 wherein said dispersed monomer comprises at least about 80 percent by weight, based on the dispersed monomer, of monomer which has a solubility in water at 20° C. of less than about 0.2 g. per 100 g. of water.

6. The polymeric dispersion of claim 5 wherein the glass transition temperature of the initial latex polymer is less than about 20° C.

7. The polymeric dispersion of claim 6 wherein the glass transition temperature of said initial latex polymer is less than about −10° C.

8. The polymeric dispersion of claim 6 wherein said mono-ethylenically unsaturated monomer comprises
   (a) from about 30 to 99.5 percent by weight, based on the total weight of solids of said initial latex polymer, of monomer selected from the $(C_1-C_{12})$alkyl esters of acrylic acid, the $(C_1-C_{12})$alkyl esters of methacrylic acids, and mixtures thereof, and
   (b) from about 0.5 to 10 percent by weight, based on the total weight of the solids of said initial latex polymer, of carboxylic acid monomer selected from acrylic acid, methacrylic acid, itaconic acid, and beat-acryloxypropionic acid and the higher oligomers of acrylic acid, and mixtures thereof.

9. The polymeric dispersion of claim 8 wherein said mono-ethylenically unsaturated monomer additionally comprises from about 2 to 15 percent by weight, based on the total weight of the solids of said initial latex polymer, of monomer selected from acrylonitrile and methacrylonitrile.

10. The polymeric dispersion of claim 8 wherein said mono-ethylenically unsaturated monomer comprises
    (a) from about 50 to 99 percent by weight, based on the total weight of the solids of said initial latex polymer, of monomer selected from the $(C_1-C_{12})$alkyl ester of acrylic acid, the $(C_1-C_{12})$alkyl esters of methacrylic acid, and mixtures thereof, and
    (b) from about 1 to 5 percent by weight, based on the total weight of the solids of said initial latex polymer, of monomer selected from acrylic acid, methacrylic acid and mixtures thereof.

11. The polymeric dispersion of claim 8 wherein said initial latex polymer additionally comprises from about 0.005 to 2 percent by weight, based on the total weight of solids of said initial latex polymer, of monomer selected from monomers having at least two sites of ethylenic unsaturation.

12. The polymeric dispersion of claim 11 wherein said initial latex monomer having at least two sites of ethylenic unsaturation includes allyl methacrylate.

13. The polymeric dispersion of claim 1 wherein said dispersion monomer comprises at least about 5 percent by weight, based on the total weight of said dispersed monomer, of monomer having at least two sites of ethylenic unsaturation.

14. The polymeric dispersion of claim 13 wherein said dispersed monomer comprises at least about 50 percent by weight, based on the total weight of said dispersed monomer, of monomer having at least two sites ethylenic unsaturation.

15. The polymeric dispersion of claim 14 wherein said dispersed monomer comprises about 100 percent by weight, based on the total weight of said dispersed monomer, of monomer having at least two sites of ethylenic unsaturation.

16. The polymeric dispersion of claim 13 wherein said dispersed monomer having at least two sites of ethylenic unsaturation is selected from the group consisting of monomers having two sites of alpha, ethylenic unsaturation and monomers having three sites of beta-ethylenic unsaturation.

17. The polymeric dispersion of claim 16 wherein said dispersed monomer having two sites ethylenic unsaturation is selected from the diacrylates and dimethacrylates.

18. The polymeric dispersion of claim 16 wherein said dispersed monomer having three sites ethylenic unsaturation is selected from the triacrylates and trimethacrylates.

19. The polymeric dispersion of claim 16 wherein said dispersed monomer having two sites ethylenic unsaturation is selected from divinyl benzene and the aliphatic conjugated dienes.

20. The polymeric dispersion of claim 17 wherein said dispersed monomer having at least two sites of ethylenic unsaturation is selected from diethyleneglycol dimethacrylate, ethyleneglycol dimethacrylate, 1,6-hexenediol diacrylate, 1,3-butyleneglycol dimethacrylate, and tripropyleneglycol diacrylate.

21. The polymeric dispersion of claim 18 wherein said dispersed monomer having three sites of ethylenic unsaturation is selected from trimethylolpropane triacrylate and trimethylolpropane trimethacrylate.

22. The polymeric dispersion of claim 16 wherein said dispersed monomer having at least two sites of ethylenic unsaturation is selected from the reaction products of at least one compound selected from diisocynates and triisocyanates and at least one compound selected from hydroxy$(C_1-C_6)$-alkyl acrylates and the hydroxy$(C_1-C_6)$alkyl methacrylates.

23. The polymeric dispersion of claim 16 wherein said dispersed monomer having at least two sites of ethylenic saturation is selected from the reaction products of at least one compound selected from di- and tri-epoxy functional compounds and at least one compound selected from acrylic acid and methacrylic acid.

24. The polymeric dispersion of claim 16 wherein said dispersed monomer having at least two sites of ethylenic unsaturation is selected from the reaction products of at least one compound selected from the di$(C_1-C_4)$alkoxylated $(C_2-C_8)$alkane diols, tri$(C_1-C_4)$-alkoxylated($C_4-C_{12}$)alkane triols, and di$(C_1-C_4)$alkoxylated Bisphenol A, and at least one compound selected from acrylic acid and methacrylic acid.

25. The polymeric dispersion of claim 7 wherein the ratio of the weight of solids of said dispersed monomer to the weight of solids of said initial latex polymer is from about 1:200 to 1:2.

26. The polymeric dispersion of claim 25 wherein the ratio of the weight of solids of said dispersed monomer to the weight of solids of said initial latex polymer is about 1:100 to 1:4.

27. The polymeric dispersion of claim 26 wherein the ratio of the weight of solids of said dispersed monomer to the weight of solids of said initial latex polymer is from about 1:19 to 1:9.

28. The polymer dispersion of claim 1 wherein said dispersed monomer comprises no more than about 95 percent by weight, based on total weight of said dispersed monomer of mono-ethylenically unsaturated monomer.

29. The polymeric dispersion of claim 28 wherein said mono-ethylenically unsaturated dispersed monomer is selected from the ($C_1$–$C_{12}$)alkyl esters of acrylic acid, the ($C_1$–$C_{12}$)alkyl esters of methacrylic acid and isobornyl methacrylate.

30. The polymeric dispersion of claim 29 wherein said mono-ethylenically unsaturated dispersed monomer is selected from methyl methacrylate, butyl methacrylate, butyl acrylate and isobornyl methacrylate.

31. The polymeric dispersion of claim 1 wherein the polymerization of said dispersed monomer is initiated by the addition of a free radical generating initiator system to the dispersion of initial latex polymer and dispersed monomer.

32. The polymeric dispersion of claim 31 wherein said initiator system is a redox system selected from t-butyl hydroperoxide/sodium formaldehyde sulfoxylate/Fe(II), t-butyl hydroperoxide/isoascorbic acid, ammonium persulfate/sodium metabisulfite and t-butyl hydroperoxide/vanadyl sulfate.

33. The polymeric dispersion of claim 32 wherein said redox system is t-butyl hydroperoxide/vanadyl sulfate.

34. The polymeric dispersion of claim 31 wherein said initiator system comprises a thermally dissociating initiator species selected from ammonium persulfate, sodium persulfate and t-butyl peroxy pivilate.

35. The polymeric dispersion of claim 34 wherein said thermally dissociating initiator is ammonium peroxide.

36. A toughened polymeric binder for coatings comprising the polymeric dispersion of claim 5.

37. A toughened adhesive comprising the polymeric dispersion of claim 5 wherein the glass transition temperature of the initial latex polymer is at least 5° C. less than the temperature of application of the adhesive.

38. A toughened roof mastic composition comprising the polymeric dispersion of claim 7.

39. A dirt-pickup resistant roof mastic composition comprising the polymeric dispersion of claim 33.

40. A toughened basecoat composition for leather comprising the polymeric dispersion of claim 5 wherein the glass transition temperature of the initial latex polymer is less than about 70° C.

41. The toughened basecoat composition for leather of claim 40 wherein the initial latex polymer is polymerized from ethylenically unsaturated monomer comprising from about 30 to 99 percent by weight, based on the weight of solids of said initial latex polymer, of monomer selected from the ($C_1$–$C_{12}$)alkyl acrylates and methacrylates and mixtures thereof.

42. The toughened basecoat composition of claim 41, wherein said ethylenically unsaturated monomer of said initial latex polymer additionally comprises up to about 20 percent by weight, based on the weight of solids of said initial latex polymer, of carboxylic acid monomer selected from acrylic acid, methacrylic acid, itaconic acid, beta-acryloxypropionic acid and the higher oligomers of acrylic acid, and mixtures thereof.

43. The toughened basecoat composition of claim 42, wherein said ethylenically unsaturated monomer of said initial latex polymer additionally comprises up to about 30 percent by weight, based on the weight of solids of said initial latex polymer, of monomer selected from acrylonitrile, methacrylonitrile, and mixtures thereof.

44. The toughened basecoat composition of claim 43, wherein said ethylenically unsaturated monomer of said initial latex polymer additionally comprises up to about 60 percent by weight, based on the weight of solids of said initial latex polymer, of aryl monovinylidene monomer.

45. The toughened basecoat composition of claim 44, wherein said monovinylidene monomer is selected from styrene and alpha-methyl styrene.

46. The toughened basecoat composition of claim 44 wherein the additional monomer comprises up to about 99% by weight, based on the total weight of additional monomer, of mono-ethylenically unsaturated monomer selected from methyl methacrylate, the ($C_2$–$C_{12}$)alkyl acrylates and methacrylates, and mixtures thereof.

47. The toughened basecoat composition of claim 46 wherein said additional monomer additionally comprises up to about 5% by weight, based on the total weight of additional monomer, of carboxylic acid monomer selected from acrylic acid, methacrylic acid, itaconic acid, beta-acryloxypropionic acid and higher oligomers of acrylic acid, and mixtures thereof.

48. The toughened basecoat composition of claim 40 wherein the dispersed monomer comprises ethylenically unsaturated monomer having at least two sites of ethylenic unsaturated selected from 1,3-butyleneglycol dimethacrylate and trimethylol propane triacrylate.

49. A polymeric binder for roof mastic comprising the polymeric dispersion of claim 7.

50. A polymeric binder for leather coatings comprising the polymeric dispersion of claim 5.

51. An aqueous polymeric dispersion of improved water-insoluble latex polymer yielding films with increased toughness and hardness, comprising an initial latex polymer and a second polymeric phase in the form of a network of domains dispersed within said initial latex polymer, wherein said second phase is polymerized from ethylenically unsaturated monomer comprising at least about 5 percent by weight, based on the total weight of said ethylenically unsaturated monomer, of multifunctional monomer having at least two sites of ethylenic unsaturation, wherein the ratio of the weight of solids of said second polymeric phase to the weight of solids of said initial latex polymer is from about 1:100 to 1:4.

52. The aqueous polymeric dispersion of improved water-insoluble latex polymer of claim 51 wherein said second phase is polymerized from ethylenically unsaturated monomer comprising at least about 50 percent by weight, based on the total weight of said ethylenically unsaturated monomer, of multifunctional monomer having at least two sites of ethylenic unsaturation.

53. The aqueous polymeric dispersion of improved water-insoluble latex polymer of claim 52 wherein said network of domains of said second polymeric phase have diameters of from about 2 to 50 nm.

54. The aqueous polymeric dispersion of improved water-insoluble latex polymer of claim 53 wherein said network of domains of said second polymeric phase have diameters of from about 5 to 25 nm.

55. The polymeric binder of claim 36 including a plasticizer sufficient to reduce the glass transition temperature of the initial latex polymer to at least 5° C. less than the temperature of application of the coating.

* * * * *